(12) United States Patent
Sunderland et al.

(10) Patent No.: US 10,927,477 B2
(45) Date of Patent: Feb. 23, 2021

(54) METHOD OF FORMING COMPOSITE FIBERS

(71) Applicants: Thomas Jefferson University, Philadelphia, PA (US); Ecofibre USA Inc., Dover, DE (US)

(72) Inventors: Mark Sunderland, Philadelphia, PA (US); Jeffrey William Bruner, Leasburg, NC (US); Lee Benjamin Williams, Greensboro, NC (US)

(73) Assignees: Thomas Jefferson University, Philadelphia, PA (US); Ecofibre USA Inc., Dover, DE (US)

( * ) Notice: Subject to any disclaimer, the term of this patent is extended or adjusted under 35 U.S.C. 154(b) by 0 days.

(21) Appl. No.: 16/859,993

(22) Filed: Apr. 27, 2020

(65) Prior Publication Data

US 2020/0340145 A1 Oct. 29, 2020

Related U.S. Application Data

(60) Provisional application No. 62/838,971, filed on Apr. 26, 2019.

(51) Int. Cl.
*C08J 3/20* (2006.01)
*C08J 3/22* (2006.01)
(Continued)

(52) U.S. Cl.
CPC ............ *D01F 8/02* (2013.01); *A41D 13/1138* (2013.01); *A41D 13/1146* (2013.01);
(Continued)

(58) Field of Classification Search
CPC .... B29K 2311/10; B29K 2511/10; C08J 3/20; C08J 3/22; C08J 5/042; C08J 5/045;
(Continued)

(56) References Cited

U.S. PATENT DOCUMENTS

2006/0009609 A1* 1/2006 Hayes .................... C08L 67/00
528/272
2016/0304726 A1 10/2016 Losehand
(Continued)

FOREIGN PATENT DOCUMENTS

CN 104746173 B 1/2017
CN 109463819 A 3/2019
(Continued)

OTHER PUBLICATIONS

"International Search Report issued in International Application No. PCT/US2020/030152 dated Jul. 6, 2020", dated Jul. 6, 2020.

*Primary Examiner* — Leo B Tentoni
(74) *Attorney, Agent, or Firm* — Vos-IP, LLC

(57) ABSTRACT

A process of forming a fiber comprised of a plurality of bio-char particles, comprising: combining a portion of a polymer with a hemp derivative, said hemp derivative selected form a hemp carbon made by pyrolyzing a quantity of hemp stalk at between 1100-1500° C. to create a char; adding the char to a milling vessel and milling the char for a period of between 1 to 16 hours, and a full spectrum hemp extract, or combinations thereof, wherein the polymer and hemp derivative are extruded to form a fiber.

8 Claims, 9 Drawing Sheets

(51) Int. Cl.
| | |
|---|---|
| *D01D 5/08* | (2006.01) |
| *D01D 5/30* | (2006.01) |
| *D01D 5/32* | (2006.01) |
| *D01D 5/34* | (2006.01) |
| *D01D 5/36* | (2006.01) |
| *D01F 1/02* | (2006.01) |
| *D01F 1/04* | (2006.01) |
| *D01F 1/10* | (2006.01) |
| *D01F 8/02* | (2006.01) |
| *A41D 13/11* | (2006.01) |
| *C08K 5/053* | (2006.01) |
| *C08K 5/01* | (2006.01) |
| *C08K 5/1545* | (2006.01) |
| *D01F 8/06* | (2006.01) |
| *D01F 8/12* | (2006.01) |
| *D01F 8/14* | (2006.01) |
| *D01F 8/18* | (2006.01) |
| *C08J 5/04* | (2006.01) |
| *B29K 311/10* | (2006.01) |
| *B29K 511/10* | (2006.01) |

(52) U.S. Cl.
CPC ...... *A41D 13/1161* (2013.01); *A41D 13/1192* (2013.01); *C08J 5/042* (2013.01); *C08J 5/045* (2013.01); *C08K 5/01* (2013.01); *C08K 5/053* (2013.01); *C08K 5/1545* (2013.01); *D01F 1/103* (2013.01); *D01F 1/106* (2013.01); *D01F 8/06* (2013.01); *D01F 8/12* (2013.01); *D01F 8/14* (2013.01); *D01F 8/18* (2013.01); *A41D 2400/10* (2013.01); *A41D 2400/26* (2013.01); *B29K 2311/10* (2013.01); *B29K 2511/10* (2013.01); *C08K 2201/005* (2013.01); *C08K 2201/014* (2013.01); *D10B 2401/13* (2013.01); *D10B 2501/04* (2013.01)

(58) Field of Classification Search
CPC .......... C08K 3/00; C08K 3/013; C08K 3/014; C08K 3/04; C08K 7/04; C08K 2201/005; D01D 5/08; D01D 5/30; D01D 5/32; D01D 5/34; D01D 5/36; D01F 1/02; D01F 1/04; D01F 1/10; D01F 1/103; D01F 1/106
USPC ............ 264/172.11, 172.13, 172.14, 172.15, 264/172.17, 172.18, 211, 349; 523/351; 524/9, 15
See application file for complete search history.

(56) References Cited

U.S. PATENT DOCUMENTS

| | | | |
|---|---|---|---|
| 2019/0323150 A1* | 10/2019 | Ke | ............................. D01F 1/10 |
| 2020/0000960 A1* | 1/2020 | Kellar | ..................... D01F 1/103 |

FOREIGN PATENT DOCUMENTS

| | | |
|---|---|---|
| KR | 10-2008-0104700 A | 12/2008 |
| KR | 10-1400249 B1 | 5/2014 |
| KR | 10-1866418 B1 | 7/2018 |
| WO | WO/2009/079583 A1 | 6/2009 |
| WO | WO/2019/210122 A1 | 10/2019 |

* cited by examiner

High Viscosity
Homogeneous

Sheath / Core

Sheath / Core / Core

Ribbon Core

Triangle Core

Three Stripes

Two Mixed Islands
in the Sea

Tipped Trilobal

13-Winged Fiber

Lotus Root

Sheath / Core / Core Triangle

Self Bulking Trilobal

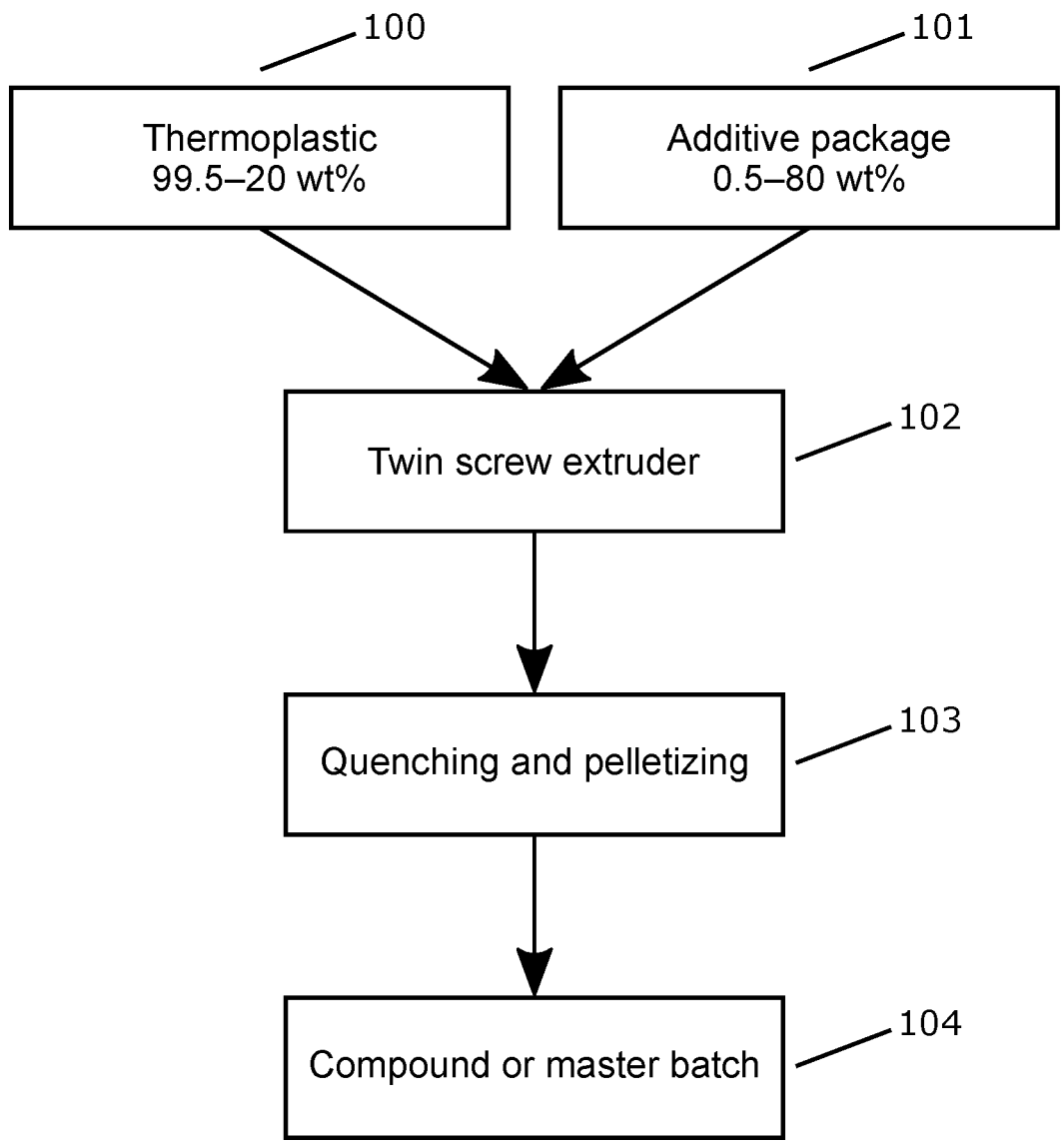

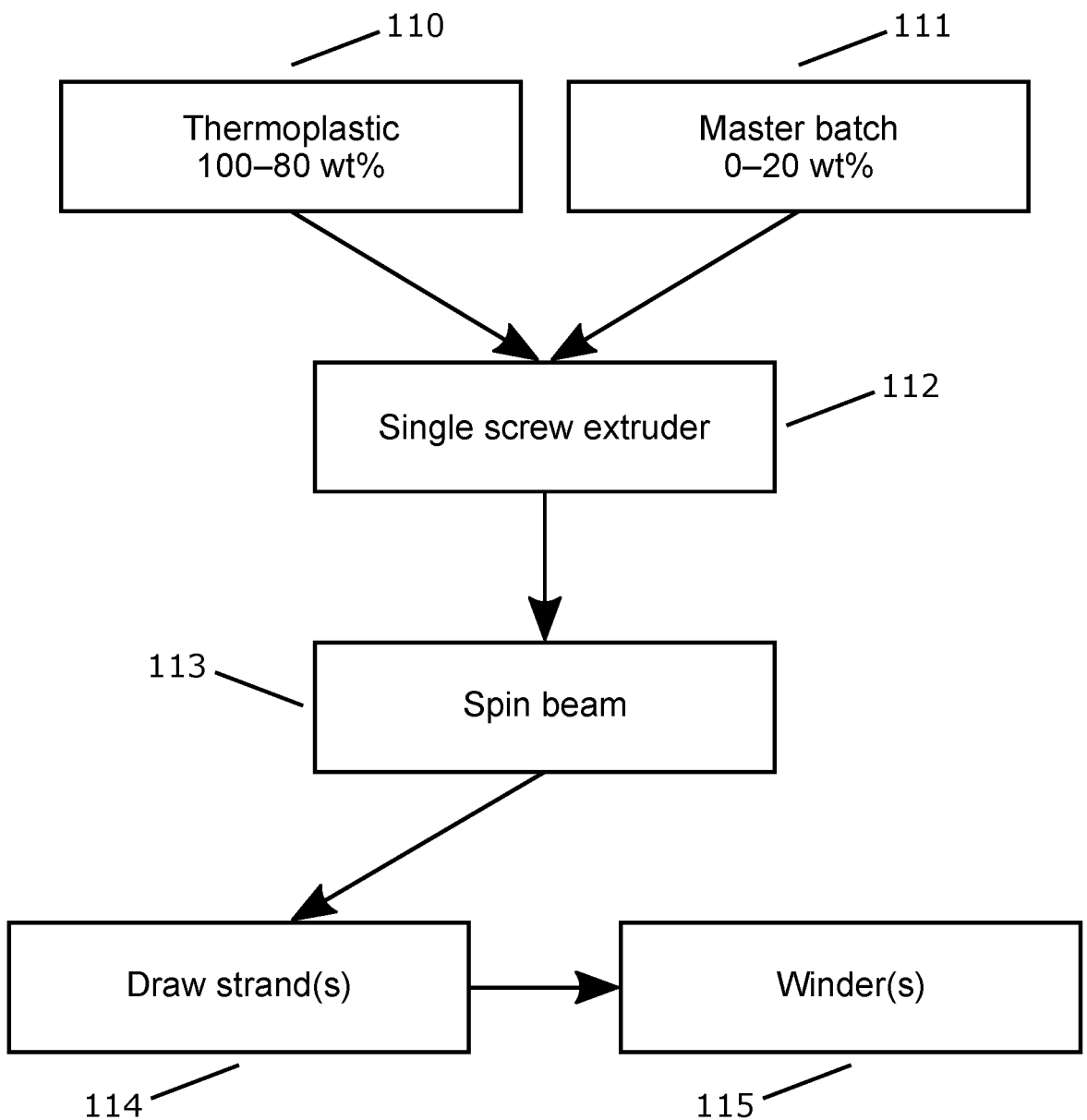

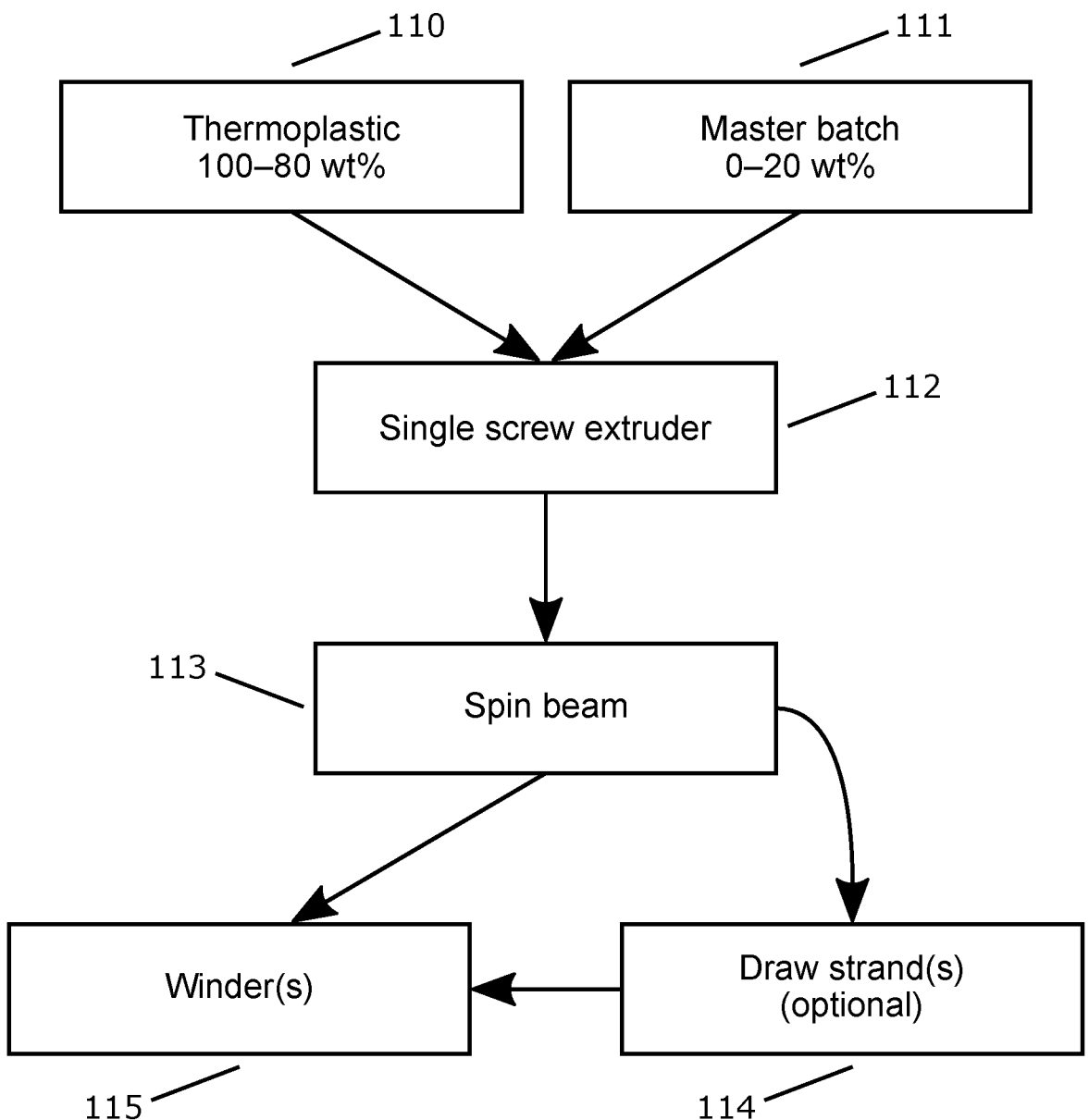

METHOD OF FORMING COMPOSITE FIBERS

CROSS-REFERENCE TO RELATED APPLICATIONS

This application claims the benefit of U.S. Provisional Patent Application No. 62/838,971 filed on Apr. 26, 2019, with the United States Patent and Trademark Office, the contents of which are incorporated herein by reference in their entirety.

FIELD OF THE INVENTION

The present application is generally related to processes and methods for forming hemp-based materials capable of being utilized in molded polymer materials, master batch processes, and products from said master batches, with resulting products having enhanced physical properties, antimicrobial properties, and/or conductive and capacitance properties for use in fibers and other materials through the inclusion of hemp based materials, specifically, the fibers comprising of oil and a polymer and in certain embodiments polymer and carbonized particles, and in other embodiments, a polymer, oil, and carbonized particles, which can be utilized to generate molded and extruded materials as well as fibers having technical properties in woven, knitted, and nonwoven fabric materials.

BACKGROUND OF THE INVENTION

Extruded materials utilize certain polymer materials, which can be heated to a melting point and then formed into a subsequent product. Thermoplastic materials can be reheated and molded, while thermoset materials are heated and then set in a shape. Such molded materials are utilized throughout the world to make a number of different products, and such materials may include colorants and other excipients to modify the polymer.

Historically, char referred to charcoal, which was used for cooking and heating. The process of making charcoal is ancient, with archaeological evidence of charcoal production going back about 30,000 years. Individuals utilize cellulosic matter, which is burned or charred at low oxygen conditions, to generate charcoal. When ignited, the carbon in charcoal combines with oxygen and forms carbon dioxide, carbon monoxide, water, other gases, and significant quantities of energy. The quantity of energy is the salient feature, as charcoal packs more potential energy per ounce than raw wood. Furthermore, charcoal burns steadily, hot, and produces less smoke and fewer dangerous vapors than raw wood. Because charcoal burns hotter, cleaner, and more evenly than wood, it was used by smelters for melting iron ore in blast furnaces and blacksmiths who formed and shaped steel, among other uses.

Many societies around the world use charcoal for cooking and heating purposes when no other heat sources are readily available. Even in modern metropolises, hardwood lump charcoal is fashionable for many of the same reasons that "organic" food is fashionable, and it has obtained an aura of being more natural, has increased flavor, and is a better way to cook. There are more than 75 brands of charcoal and some are even varietal, including: cherry, mesquite, coconut shell, tamarind, etc. Each of these varietals are essentially identical, except for their plant origins and traces of oils defining their unique scents and raw source material.

Hardwood lump charcoal is frequently made from hardwood scrap from sawmills and from flooring, furniture, and building material manufacturers. However, absent such scrap material, sources often include branches, twigs, blocks, trim, and other scraps for generating the material. The result of such variety of material is lumps that are irregular in size, often looking like limbs and lumber. Often, this material is carbonized to different degrees because the differently sized lumps lead to slight differences in burn and temperature among the materials. Lump is particularly valued for cooking as it leaves little ash since there are no binders as with manufactured charcoal, thus leaving a cleaner product than manufactured charcoal, and supposedly provides natural flavors for cooking. Certain charcoals contain additional fillers or accelerators, to aid in combustion, while others, e.g. binchotan, burn at much higher temperatures due to their particular processing.

Interestingly, as wood and other cellulosic materials are carbonized, the material structurally changes into simple carbon structures. This has been historically utilized for its absorptive properties, for example in filtering wastewater as well as binding body toxins. Large amounts of carbon are utilized for these purposes in numerous industries.

Composite polymer materials can offer increased strength, decreased density, and numerous other beneficial characteristics over traditional plastics. These reinforced materials often have superior strength-to-weight and stiffness-to-weight ratios and have a wide range of physical and thermal characteristics that make them ideal for product creation.

Indeed, the inclusion of certain types of micron-sized particles in polymer composites, in addition to altering mechanical and physical properties, can also cause the composites to be conductive or capacitive in nature or enhance a polymer's natural conductivity (Lu and Xu 1997; Gao, et al. 2010; Jiang, et al. 2006; Yan and Jeong 2017). This technological advance in polymer chemistry has inspired significant research into energy storage and energy management applications. The inclusion of carbon-based fillers, such as graphene (Potts, et al. 2011; Kim, et al. 2011) and carbon nanotubes (CNTs) (Ma, et al. 2010; Manchado, et al. 2005; Coleman, Khan, and Gun'ko 2006) have been shown to improve the mechanical, thermal, and electrical properties of polymer composites. Flexible polymer composites with a high dielectric permittivity (high-κ values) have attracted attention for their possible applications in high performance electronics, wearable devices, and smart fabrics. An increase in the dielectric permittivity leads to larger energy densities which can be utilized for energy storage (Bikky, et al. 2010).

Companies are searching for biodegradable polymers and composites because they are becoming more aware of environmental and waste management issues, decreasing fossil fuel resources, and rising oil prices (Bergert 2011). The design and production of sustainable composite materials is occurring in industries ranging from the construction industry to the packing industry, yet materials are lacking that possess similar or improved properties as compared to the petroleum-based carbons.

The processes and methods described herein advantageously provide new methods and processes to generate fibers having fine denier sizes, comprising hemp-based materials, including oils, particles, or combinations thereof, and wherein the hemp-based materials are combined with a polymer to generate the fine fibers. Advantageously, the same materials may also form composites, or be extruded, depending on the polymer choice and percentages of the combined materials.

SUMMARY OF THE INVENTION

In a preferred embodiment, a method of forming composite fibers comprising: combining a thermoplastic polymer with a portion of a hemp derivative, wherein said hemp derivative selected from the group consisting of carbonized hemp, which is charred at between 1100° C. and 1500° C. and milled into a powder of less than 2 microns in size, a full spectrum hemp extract, or combinations thereof; mixing the thermoplastic polymer with the portion of hemp derivative and heating the same to a melt temperature; and extruding the composite fiber.

In a preferred embodiment, the method wherein said fiber is a single component, a bicomponent, or a tricomponent yarn.

In a preferred embodiment, the method wherein the composite thread has a denier size of between 0.1 and 40.

In a preferred embodiment, the method wherein the composite thread further comprises between 0.1 and 20.0 weight percent of carbonized hemp.

In a preferred embodiment, the method wherein the full spectrum hemp extract is between 0.1 and 2.0 weight percent of the composite.

In a preferred embodiment, the composite comprising at least one excipient selected from the group consisting of: pigments, UV stabilizers, antioxidants, heat stabilizing components, flame retardants, antimicrobial agents, nucleating or clarifying agents, optical brighteners, compatibilizers, and combinations thereof.

In a preferred embodiment, the carbon comprises 95% of particles between 0.1 and 2 microns.

In a preferred embodiment, wherein the polymer is a thermoplastic polymer.

In a preferred embodiment, the method wherein the portion of hemp derivative is admixed via a master batch, said master batch comprising between 1 and 50% of the total weight of the fiber.

In a further preferred embodiment, a sustainable hemp-based composite material comprising: a sustainable hemp-based carbon, said carbon comprising a plurality of particles with 99% of said particles having a size of less than 2 micron in the major axis of each particle; and a polymer; said composite material comprising from between 0.5% and 20% of the carbon. In a further embodiment, the sustainable hemp-based carbon made by the above process.

In a preferred embodiment, a process for creating a master batch mixture of micron-sized char having a specific classification size comprising: charring a portion of hemp at a temperature of greater than 1100° C. and collecting the charred hemp; milling the charred hemp for a sufficient amount of time to generate a portion of micron-sized hemp char having a size of less than 2 microns along the major axis of the particle; adding the less-than-2-micron char into a master batch with a polymer wherein the master batch can be advantageously added to a base polymer and formed into a molded material.

In a further preferred embodiment, the hemp char has an average size of less than 1.5 microns, or less than 1.0 micron, or less than 0.5 micron.

In a further preferred embodiment, where a numerical value is provided for micron size, and wherein 50% of the char has a smaller size than the given integer. In a further preferred embodiment, wherein 75%, 90%, 95%, 99%, and 99.9% of the hemp char comprises a size of less than the stated integer along the major axis of each particle.

In a further preferred embodiment, wherein the process forms an extruded fiber, and wherein said fiber can be combined with a plurality of fibers to form a bicomponent or tricomponent yarn.

In a further embodiment, a process for creating a master batch for generating a mixture of micron sized hemp char particles having a greater than 90% specific classification size of less than 2 microns in size comprising: charring a portion of hemp stalk within a furnace at 1100° C. or greater for a time sufficient to char the material to create a charred material; collecting the charred material and milling the charred material to create a char powder; classifying the char powder in a classification system comprising at least one 2-micron classification sieve, wherein materials of less than 2 microns pass through the 2-micron classification sieve; collecting the materials passing through the 2-micron classification sieve, and adding said materials passing through the 2-micron classification sieve to a master batch with at least one polymer.

In a further preferred embodiment, the process further comprising a full spectrum hemp extract or an essential oil combined at between 0.1 and 50% of the total weight of the master batch.

In a further embodiment, a master batch comprising a portion of base polymer and a portion of a hemp derivative; said hemp derivative selected from the group consisting of carbonized hemp, which is charred at between 1100 and 1500 Celsius and milled into a powder of less than 2 microns in size, a full spectrum hemp extract, or combinations thereof, and wherein the master batch comprises between 0.1 and 50% of full spectrum hemp extract, or 0.1 to 50% of a carbonized hemp, or combinations thereof.

In a further embodiment, a composite fiber made by any one of the processes above, comprising between 0.1 to 20% of a hemp derivative. In a preferred embodiment, wherein the hemp derivative is selected from the group consisting of a charred hemp carbon, a full spectrum hemp extract, and combinations thereof.

In a further embodiment, a process of generating a non-metallic conductive fiber comprising: carbonizing a portion of hemp in a furnace, said furnace being flushed with nitrogen and then heated to at least 1100° C., wherein the at least 1100° C. temperature is held for at least 60 minutes and wherein nitrogen flow is maintained over the heating and hold times to maintain a low oxygen environment; removing the hemp from the furnace and cooling it to room temperature; milling the cooled hemp to a particle size of less than 2 microns; and combining the milled hemp with a polymer and postprocessing the hemp and polymer into a fiber; wherein the fiber comprises between 0.1 and 20 weight percent of the milled hemp.

In a preferred embodiment, the process wherein the temperature is increased at a linear heat ramp.

In a preferred embodiment, the process wherein at least 90% of the particles are less than 2 microns. In a further preferred embodiment, the process wherein the arithmetic mode of all particles is between 1 and 2 microns. In a further preferred embodiment, wherein the arithmetic mean of all particles is between 1 and 2 microns. In a further preferred embodiment, wherein at least 95% of the particles are of less than 2 microns. In a further preferred embodiment, wherein at least 99% of the particles are of less than 2 microns.

In a further preferred embodiment, the process wherein the postprocessing of the hemp and polymer generates an extruded fiber, and wherein the milled hemp comprises between 1 and 20% of the total weight of the extruded fiber. In a further embodiment, the process wherein the milled hemp comprises between 1 and 10% of the total weight of the extruded fiber. In a further preferred embodiment, the process further comprising the addition of 0.1-20 weight percent of a full spectrum hemp extract. In a further preferred embodiment, the process further comprising the addition of 0.1-20 weight percent of an essential oil.

In a further preferred embodiment, the process wherein the essential oil is selected from the group consisting of: a hemp-based oil, allspice, angelica, anise, basil, bay leaf, benzoin, bergamot, birch, bitter almond, black pepper, boldo, buchu, cajuput, calamus, chamomile, camphor, caraway, cardamom, carrot seed, cassia, catnip, cedarwood, cinnamon, citronella, clary sage, clove, coriander, cumin, cypress, davana, dill, elemi, eucalyptus, fennel, frankincense, galbanum, geranium, ginger, grapefruit, helichrysum, hyssop, jasmine, juniper, lavandin, lavender, lemon, lemongrass, lime, mandarin, manuka, marjoram, melissa, mugwort, mullein, mustard, myrrh, myrtle, neroli, niaouli, nutmeg, oakmoss, orange, oregano, palma rosa, parsley, patchouli, pennyroyal, peppermint, petitgrain, pimento, pine, ravensara, rose, rosemary, rosewood, rue, sage, sandalwood, spearmint, spikenard, tagetes, tangerine, tansy, tarragon, tea tree, thuja, thyme, tuberose, vanilla, vetiver, wintergreen, wormwood, yarrow, ylang ylang, and combinations thereof.

In preferred embodiments, the process wherein the milled hemp comprises between 0.01% and 20% of a master batch, and wherein in the total weight of an extruded fiber the milled hemp comprises between 0.01% and 5% of the total weight of an extruded fiber.

In a preferred embodiment, the master batch comprises a polymer and a portion of a full spectrum hemp extract which is present at between 0.05% and 20% of the weight percentage of the master batch. In certain embodiments, in formation of industrial fibers carbon particles utilized in the manufacture of fibers can be between 3-5 microns for the major axis; and which are combined with a suitable polymer to generate a fiber, film, yarn, or polymer for subsequent processing.

In a preferred embodiment, a nonmetallic conductive fiber made by the process above, comprising between 0.1 and 20 weight percent of carbonized hemp.

In a further preferred embodiment, a three-dimensional facemask knitted from composite materials comprising a generally cup shaped configuration for securing around a mouth and nose of a person, said facemask comprising a first layer made from a composite yarn comprising a polymer and copper and a second layer made from a composite yarn comprising a polymer and a full spectrum hemp extract; said first layer comprising a first side and a second side and said second layer comprising a second layer first side and a second layer second side; said first and second layers placed adjacent to one another wherein the second side of the first layer and the second layer first side are in contact; a left and right ear strap; and means for connecting said left and right ear straps to said facemask.

In a preferred embodiment, the facemask wherein said first layer comprises between 1.0 and 5.0 weight percent of copper and the second layer comprises between 0.5 and 2.0 weight percent of full spectrum hemp extract. The facemask wherein the polymer in said first layer and said second layer comprises a polyester, polypropylene, or nylon polymer. The facemask wherein the first or second layer comprises a pigment, a UV stabilizer, an antioxidant or heat stabilizer, a flame retardant, an antimicrobial agent, a nucleating or clarifying agent, an optical brightener, a compatibilizer, or combinations thereof.

BRIEF DESCRIPTION OF THE FIGURES

FIG. 5 depicts a process for master batch and compound manufacturing.
FIG. 6 depicts a process of monofilament yarn extrusion.
FIG. 7 depicts a process of multifilament yarn extrusion.

DETAILED DESCRIPTION OF THE INVENTION

Figure 1A:
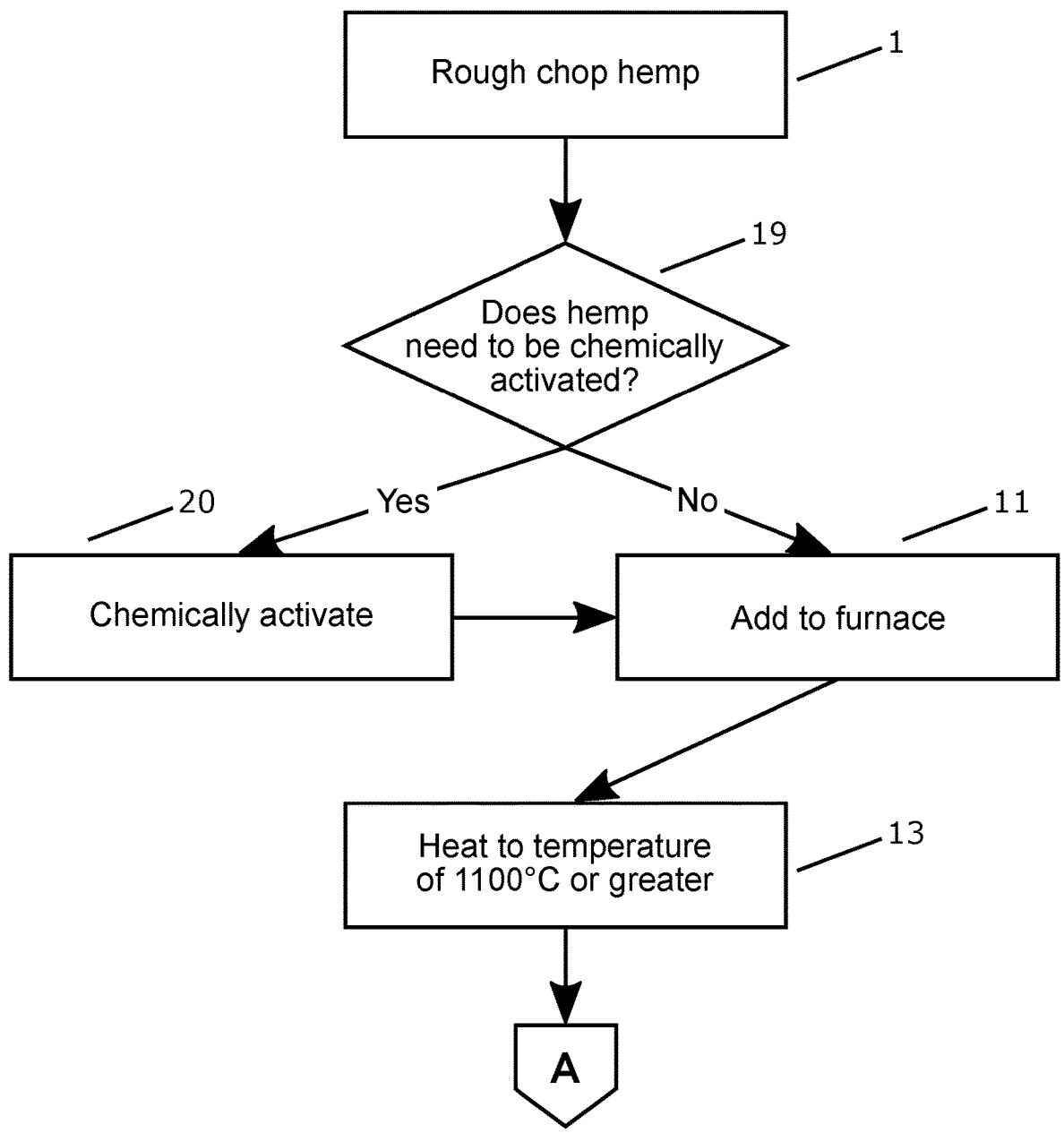
FIGS. 1A and 1B depict a flowchart of a method of carbonizing hemp and a classification process for hemp.

Hemp has a long history of industrial use and was widely cultivated in the world for its rough use for the fiber portion of the plant. Hemp has many advantages over other agricultural crops, namely, the plant itself is resilient to weeds, it can be harvested 2-3 times a year, and it does not need pesticides or herbicides to flourish. Its deep root system means that hemp plants need much less nitrogen (fertilizer) and water to flourish compared to other crops like cotton. Moreover, farmers can use hemp plants as an alternative to clear fields for other crops. The average hemp plant grows to a height of between six (6) feet and sixteen (16) feet and matures in approximately seventy (70) to one hundred ten (110) days, thus facilitating multiple harvest opportunities each year in many areas of the world. A hemp crop has the potential of yielding 3-8 tons of dry stalks per acre per harvest while remaining carbon negative.

Indeed, the fibrous portion of the hemp plant was used to make a variety of materials including paper products and fibers for weaving. The process to separate the fibers from the hurd portion was time consuming and used significant amounts of water. However, the fibers could be woven together to create long strands, or intermixed with animal fibers, and then woven into materials.

Widespread use of hemp was dramatically reduced during the Twentieth Century due to the concern regarding the amounts of tetrahydro cannabinoids (THC) within the plants, though industrial hemp contains virtually zero THC. Indeed, there are a number of different strains/cultivars of the hemp plant that contain smaller and larger amounts of the psychoactive compound THC, and thus cultivation can be optimized for the particular growth and THC content that is desired, including plants with low to zero THC. These traits, as well as those related to biomass, growth structure, and other properties, may be naturally derived through strains and crossbreeding as known to those of ordinary skill in the art, or genetically modified.

Hemp and other plant materials contain a number of chemicals which can be extracted using a number of known techniques including carbon dioxide extraction, alcohol extraction, percolation methods, supercritical fluid extraction, pyrolysis, ultrasonic, and Soxhlet (SOX). The various extraction techniques have different pluses and minuses based on the ultimate use of the material. These extracted materials may be utilized alone or in a carrier oil, such as MCT oil, hemp oil, or other suitable carrier oils.

The use of hemp fibers to create fiber is well known, but the use of hemp byproducts in formation of modern fibers is new. Modern fibers are created from synthetic and natural polymers and possess numerous unique properties that can be harnessed by those wearing materials made from the fibers. For example, certain metallic components such as a silver or copper have been added to generate antimicrobial properties or other properties that were not possible with the underlying fiber alone. By inclusion of the metallic component or element into the fiber, the antimicrobial properties of the metal were generated to the fiber. In other samples, metallic material is provided within a fiber to provide conductive properties. It is desirous to provide new materials that can provide enhanced properties above and beyond the properties of the polymer base and do not require a metallic component or petroleum based carbon sources.

Polymers can be utilized in a number of industrial processes whereby they are molded, extruded, cast, or otherwise formed into materials of a variety of shapes. For example, the polymer may be utilized through injection molding, blow molding, film formation, fiber formation, and the like. Typically, the process requires the addition of a bulk polymer into a machine wherein the polymer is heated to a temperature based on the specific polymer, and then the material is formed into the material as desired. While the material may contain 100% of the polymer, in many cases the polymer is admixed with any number of additional excipients before being processed. The materials and processes described herein, advantageously utilize hemp based components to impart new properties to the polymer materials.

Bulk pellets of a desired material may be simply added to an extrusion machine, which heats the pellet material to a predetermined temperature based on the melting point of the material and then forms the melted material into a shape. While bulk formation can yield nearly any imaginable shape, it is also possible to utilize these materials to extrude fine fibers which can be utilized for woven, knitted, and nonwoven materials as is understood by those of ordinary skill in the art.

Mixing of polymers is not a straightforward process. The machinery utilized to make certain materials uses pumps and motors that heat, mix, and then extrude, mold, or cast material. In the simplest form, a single screw extruder utilizes a bulk raw polymer material, which is heated to a specific temperature, based upon the polymer utilized, to melt the polymer. This now melted material is pressed by the rotating screw through the machine, extruded through the nozzle, and captured or pressed into a mold for forming of certain shaped materials. This is generally detailed in FIGS. 5, 6, and 7. With a simple polymer material only the bulk material is added into the single screw extruder, thus little, if any, mixing of the material is necessary, as it is already uniform and ready for processing.

However, in many circumstances, the polymer requires a color or another excipient to modify the resulting structure of the material. As described herein, Applicant utilizes hemp based products in combination with the polymer to form new materials in a master batch or through to finished products. The process, when admixing excipients, does not simply use one machine, as temperatures may vary and mixing of materials can be difficult in a machine that is otherwise perfect for extruding the materials.

Thus, to ease the blending of materials as well as ensure that the polymer is not degraded, a master batch is created. A master batch is a highly concentrated, pre-dispersed additive or additive package in a base resin. The additive can either be a single component or a multicomponent blend of additives, hence an additive package. The master batch is dosed at a defined ratio into the bulk polymer to make the final product, i.e. 10% of a master batch containing 10% of an additive, dosed into the base polymer, yields a 1% final additive loading. The use of master batches in this fashion means that the base resin material is not as degraded.

The master batch may comprise excipients such as: pigments, UV stabilizers, antioxidants, heat stabilizing components, flame retardants, antimicrobial agents, nucleating or clarifying agents, optical brighteners, compatibilizers, and other agents known to those of ordinary skill in the art. For example, as described herein, full spectrum hemp extract and hemp-based carbon are preferred excipients. These can be admixed into the master batch or alternatively directly added into a base polymer separately from a master batch.

In the preferred embodiments herein, the fibers, yarns, and molded materials are made from a polymer, at least one hemp-based product, and optionally one or more additional excipients. The hemp-based product is either a full spectrum hemp extract or a hemp-based carbon char, or a combination of the two. The materials are advantageously mixed in appropriate concentrations before they are utilized to extrude fibers or mold materials, as is described in detail below.

Polymer Choices for Master Batches, Fibers, and Extruded Products

Extrusion requires that the polymer be heated to reach a melted state that allows it to be expressed through the nozzle of the extrusion machine. However, not all polymers are identical, with many having varying melting points. Furthermore, the excipients added to the material may have different melting points or vaporization temperatures, or otherwise be modified at or above a certain temperature. Accordingly, the specific polymer utilized (and its resulting temperature) is important to prevent degradation of the excipients and of the polymer material, and thus it is necessary to keep the heat lower than the temperature of the polymer matrix. Typically, this temperature is between 100° C. and 285° C., though those of skill in the art will recognize other polymers and their specific melt temperatures.

Polymers are a class of compounds having a variety of different characteristics. For the purposes of the inventions here, thermoplastic and thermoset polymers are of interest. There are numerous polymers that can be used for extruding fibers. The polymer serves as the foundational base material, often making up the major weight percentage of the final product and serves as a carrier to hold any number of excipients desired in the final product. In forming products, the polymers can be admixed with a full spectrum hemp extract, oil, carbon, or other excipient components such as pigments, UV stabilizers, antioxidants, heat stabilizing components, flame retardants, antimicrobial agents, nucleating or clarifying agents, optical brighteners, compatibilizers, and other agents known to those of ordinary skill in the art.

Biodegradable polymers include those which are durable enough for their particular application but upon disposal break down under atmospheric conditions. A nonexhaustive list of biodegradable polymers includes polylactic acid, polyglycolide, polyglycolic acid, polylactide, polyhydroxybutyrate, chitosan, hyaluronic acid, and hydrogels. In particular, poly(2-hydroxyethyl-methacrylate), poly(ethylene glycol), chitosan, and hyaluronic acid have been used extensively in the repair of cartilage, ligaments, and tendons.

In comparison, sometimes the polymer should not degrade rapidly. Accordingly, a nonexhaustive list of non-biodegradable polymers include silicone rubber, polyethylene, polystyrene, polycarbonate, acrylic resins, polyurethane, polypropylene, and polymethylmethacrylate, as well as those based on fluorocarbons and certain hydrocarbon polymers.

Thermoplastics are a class of polymers that can be softened or melted at elevated temperatures. There are many classes or families of thermoplastics, such as olefins, polyesters, polyamides, and many others. A key element of thermoplastics, and what makes them valuable tools of industry and manufacturing is their relatively high molecular weight and relatively narrow molecular weight distribution. Molecular weight and its distribution typically follow a gaussian curve. Where the peak of the gaussian curve falls on the x-axis determines the mean molecular weight. The breadth of the gaussian curve determines the molecular weight distribution. The molecular weight and its distribution are keys in the processing characteristics of the various thermoplastics. Molecular weight and molecular weight distribution can be evaluated in many ways, and how it is evaluated is typically determined by the industry that processes the specific type of thermoplastic.

Thermoplastic polymers differ from thermoset polymers in that the latter does not remelt. Once a thermoset has hardened, heating it will not soften or melt it. Examples of thermoset polymers are: epoxies, polyurethanes, silicones, and phenolics.

Polyethylene terephthalate (PET) is an engineering thermoplastic resin in the polyester family that is commonly used in yarn and filament formation. The repeat unit of this molecule is $(C_{10}H_8O_4)_n$. Typical glass transition temperature ($T_g$) and melt temperature ($T_m$) of PET is 81° C. and 260° C., respectively. PET is used in many applications from textile fibers to disposable beverage bottles. PET is recyclable (rPET). The melt flow characteristic important in the extrusion of PET is the intrinsic viscosity (IV). IV is determined by the equation, $$[\eta] = \lim_{\phi \to 0} \frac{\eta - \eta_0}{\eta_0 \phi}$$

where $\eta$ is the viscosity of the solution, $\eta_0$ is the viscosity of the solute in absence of the solvent, and $\phi$ is the volume fraction of the solute in the solution.

Polypropylene (PP) is a commodity thermoplastic resin in the olefin family. The repeat unit of PP is $(C_3H_6)_n$. PP has a relatively low $T_g$ of −10° C. and a $T_m$ ranging from 130° C. to 171° C., depending upon tacticity. Common uses of PP include textile fibers and yarns, food containers, and automotive parts. Melt flow index (MFI) is the most critical variable to the extrusion process of PP. MFI is determined by the extrusion at a specific temperature at a specified force through a die of a specific cross-sectional area for a specific amount of time of PP. MFI is reported in grams per 10 minutes.

Nylon 6 (PA6) is an engineering resin that is a member of the polyamide family. The repeat unit for PA6 is $(C_6H_{11}NO)_n$. The $T_g$ for PA6 is 47° C. and the $T_m$ is 220° C. Uses for PA6 are wide and cover many industries; the textile industry is a major consumer of PA6, as is the automotive industry. Processors of PA6, injection molders and extruders, generally pay attention to the relative viscosity (RV). RV is calculated by $$\eta_{rel} = \frac{\eta}{\eta_s}$$

where $\eta$ is the viscosity of the solution and $\eta_s$ is the viscosity of the solvent.

Polylactic Acid (PLA) is a polyester that is derived from corn and other natural sources. The PLA repeat unit has a formula of $(C_3H_4O_2)_n$. PLA's have a wide range of grades and as such have a wide range of thermal values. $T_g$ can range from 60° C. to 65° C. and $T_m$ can range from 130° C. through 180° C. Uses for PLA range in variety from textile yarn and filaments, extruded film, and food packaging. PLA melt characteristics are reported in both WI and RV.

When extruding yarns, a thermoplastic material is utilized. By contrast, when a composite material is made by extrusion or blow molding, then either thermoplastic or thermoset polymers may be utilized. Acetate, nylon, polypropylene, PET, and PLA were primary materials tested herein, which serve as a representative sample for polymeric materials. In certain instances, it may be suitable to combine polymers, such that the properties of each polymer are imparted into the material. This may include combinations of biodegradable and nonbiodegradable polymers.

Certain additional additives may be advantageously added into the polymer to modify the resultant material. For example:

Pigments, including $TiO_2$, Carbon Black, Inorganic Colorant Pigments, and other natural or synthetic materials known to those of ordinary skill in the art.

UV Stabilizers, including UV Absorbers such as: benzophenones, benzotriazoles, and benzotriazines. Additionally, materials such as Hinder Amine Light Stabilizers (HALS) may be utilized. Those of ordinary skill in the art will recognize these materials and their use.

Antioxidants/Heat Stabilizers, including but not limited to: phenylated and phosphitic materials.

Flame Retardants, including but not limited to: phosphorus, organometallic phosphors, and dragonite.

Antimicrobials, including but not limited to: metallics, such as: silver-based, zinc-based, copper-based; plant extracts, essential oils, and other oils and extracts from trees and plants.

Nucleating/Clarifying Agents, including but not limited to: Millad NX8000, licomont NAV, and dibenzylidene sorbitol.

Optical Brighteners, including but not limited to: 2,2'-(1, 2-ethenediyl)bis(4,1-phenylene)bisbenzoxazole, 2,2'-(2,5-thiophenediyl)bis(5-tert-butylbenzoxazole), and distyryl biphenyl compounds.

Compatibilizers, including but not limited to: maleic anhydride, glycidyl methacrylate, and ethylene-ethylacrylate copolymers.

Full Spectrum Hemp Extract

Full Spectrum Hemp Extract is a made through processes such as alcohol extraction, benzene extraction, supercritical $CO_2$ extraction, and others to extract cannabinoids and terpenes that are natively found in the hemp plant. Once extracted and refined, the solvent is removed, which produces a Full Spectrum Hemp Extract (FSHE) containing cannabinoids, terpenes, and other molecules from the extraction. This FSHE can be further refined and the individual cannabinoids and terpenes can be isolated if so desired, though in the embodiments herein the FSHE is utilized in quantities of between 0.1% and 20% in a master batch, yielding a typical quantity of between 0.01% and 2% weight percentage in a final product.

FSHE contains cannabinoids, which are a group of organic compounds produced by the *Cannabis* plant (hemp). Over 100 cannabinoids have been isolated, to date. Some important cannabinoids are tetrahydrocannabinol (THC), cannabidiol (CBD), cannabinol (CBN), cannabigerol (CBG), cannabichromene (CBC), and others. Typically, cannabinoids contain a benzene complex with an aliphatic tail, which makes them soluble in oils, acids, fats, alcohols, and organic solvents.

Hemp plants also contain high levels of terpene molecules, which can be extracted. Terpenes are a wide-ranging class of organic compounds produced by plants, insects, animals, fungi, archaea, and bacteria. Terpenes can also be industrially produced. Terpenes are commonly used in cosmetics, food additives, and essential oils, which provide the aromatic scents found in many essential oils.

Hemp-Based Carbon

Growth of hemp is predicated on simply growing biomass. Any of the various cultivars of the *Cannabis* family, including the *Cannabis sativa* plant, and biowaste from hemp growth can be utilized. In this manner, we can capture biomass from other industries that are interested in processing seeds or leafy greens and utilize both the fibers and hurd from the stalk. The hemp material is preferably utilized within a specific window after harvest to prevent the natural separation of the fiber from the hurd, which leads to the formation of sticky residues that impact the efficiency of postprocessing. This sticky resin material, once formed, reduces the ability to efficiently char the hemp, and further reduces the yield of milled char that is generated under 2 microns in size. Accordingly, after cutting the hemp stalks they are dried, preferably in a controlled manner, for example in a drying room or chamber, that evenly allows for drying and reduces retting and growth of mold or fungus. However, it may be suitable to cut the hemp and allow it to dry on the field for 0-7 days and/or collect it and finalize the drying process in a controlled environment.

Hemp serves as an ecofriendly source of carbon that is sustainable and reproducible, unlike currently available carbon sources used in polymer materials. Thus, use of hemp is ideal in an effort to pursue sustainable and environmentally responsible bio-char material suitable for use in a variety of master batch processes and as a replacement for petroleum-based components, which are nonsustainable and are expensive and time/process intensive, including materials such as CNTs (carbon nanotubules) and graphenes. These materials are utilized in any number of commercial products but suffer from their negative carbon footprint, their lack of sustainability, and their potential for carcinogenic properties. Applicant has identified micron- and submicron-sized particle bio-char hemp-based materials and processes for generating the same.

Process for Generating Substantially Homogeneous Particle Sizes of Hemp Carbon for use as a Pigment or for Imparting Electrical Properties to Fibers While certain cellulosic materials are both easily carbonized and then reduced to a millimeter particle size, this is not so with the hemp material. First, a much smaller size particle is generated by the processes described herein, specifically toward a particle size of less than 2 microns in size. Secondly, the low density of the material and the small size necessary for creating highly valuable materials renders the milling and classification process to be extremely difficult. As detailed in Table 1, the density of hemp is dramatically less than typical char products, which impacts the ability to mill and classify the resulting material. Several processes were tried that resulted in varying levels of success with regard to consistency and yield, including hand grinding, wet milling, ball milling, air jet milling, and combinations thereof. The end product must both meet a minimum particle size, but also be precise within the total particles within the mixture within the bell curve distribution for the particle sizes.

TABLE 1

Density of certain materials

| Species | Density of Dry Wood (lb/ft$^3$) | Weight of dry cord (lb) | Recoverable heat value of Cord (millions of BTU) |
|---|---|---|---|
| Aspen | 27 | 2290 | 10.29 |
| Cherry | 36.7 | 3121 | 14 |
| Hickory | 50.9 | 4327 | 19.39 |
| Red Oak | 44.2 | 3757 | 16.8 |
| Hemp | 8.74 | 741 | 3.33 |

In preferred embodiments, the process utilizes hemp stalk. However, a wide range of hemp materials, including full hemp stalks, chopped full hemp stalks, chipped full hemp stalks, full hurd, chopped hurd, chipped hurd, ground hurd, separated hurd and fiber, chopped separated hurd and fiber, chipped separated hurd and fiber, ground separated hurd, and ground separated fiber may be utilized for certain applications. As detailed below, and in Table 2, the combination of the hurd and fibers provides a superior material for electrical and capacitance properties.

Pyrolysis Of Hemp

When performing pyrolysis, bio-charring temperatures at preferably between about 600° C. and about 1500° C. and can be performed via batch or continuous flow processes. As seen in FIG. 1A, rough chopped hemp (1) is added to a heating apparatus such as a furnace or incinerator (11) and then heated to more than 1100° C. (13). An intermediary question is whether the hemp needs to be chemically activated (19), and if yes, then it is chemically activated (20) and then added to the furnace (11). In particular, the heating process is done at low oxygen percentages; this is to prevent the complete combustion of the material, as known to those of ordinary skill in the art. Accordingly, the chamber is filled with one or more inert gasses during the charring process. While a temperature of at least 600° C. is sufficient to char the material, it leads to uneven burn of the material. More importantly, processing at the low end of the temperature scale leads to low amounts of conductivity on its own. Furthermore, in subsequent processing of the material into micron and submicron-sized particle sizes, the inconsistent char makes it impossible to effectively grind to a substantially homogeneous particle size with any reasonable yield.

Pyrolysis from about 1100° C. to about 2000° C. not only produces an evenly charred material, but also produces a material with higher conductivity than if processed at a lower temperature. Thus, when processing above 600° C. but below about 1100° C., it is necessary to further activate the carbon in order to modify the cellular structure through an activation step, which is typically steam activation or chemical activation (20). This activation step is not as efficient as high temperature pyrolysis.

The process herein is unique in several ways. First, as defined in FIG. 1A, the activation process is preferably carried out at a temperature of 1100° C. or greater (13) in low oxygen conditions, with an upper range of about 2000°

C., though mostly between 1100° C. and 1200° C. Most bio-charring (charcoal formation) is not carried out at such high temperatures. Furthermore, the physical characteristics of the hemp plant make the subsequent processing of micron-sized particles exceedingly difficult at any suitable yield, as detailed in Table 1, which shows that hemp is a lower density than other common cellulosic materials used for making char. The lightweight and low density nature of hemp makes it more difficult to process into a uniform and small particle size necessary for its use in certain materials described herein.

When activating the carbon, high temperature activation is preferred, with steam activation and chemical activation as other less preferred embodiments. High temperature activation is the most sustainable, but each are sufficient to open the surface area of the char, which improves moisture management, antistatic, friction, and aesthetic characteristics. Indeed, when the material is activated, one gram of carbon results in 32,000 square feet of surface area.

Accordingly, the process of pyrolyzing and activating the hemp material is important for imparting certain physical properties to the material. This is optimized by charring the hemp at a temperature of above 1100° C. to about 1600° C., which yields improved electrical or conductive properties as depicted in Table 2. Applicant has generated a process and material that is of a small size, is relatively distributed under a bell curve for sizes between 0.1 and 2 microns, and which yields materials that when added in sufficient concentration are conductive. Interestingly, commercially available carbon black provides resistivity of about 0.1Ω when loaded at between 20% and 30% by weight. We have found that the carbon materials of the present disclosure, made from carbonized hemp, are conductive at lower concentrations, specifically, concentrations at 5% to 20% yield conductivity, though concentrations at 20%-30%, just as the carbon black, are also conductive.

Table 2 shows a summary of electrical properties of certain char materials. Applicant tested the ability to transmit a charge through a material comprising 20% carbonized hemp material with a polymer carrier. The carbonized hemp material and temperature of char was varied to determine an optimal process for manufacture, as detailed in the results in Table 2. In sum, a char temperature of greater than 1100° C. showed improved results as compared to those charred at below 1100° C. Accordingly, when using carbon that is generated at a temperature of greater than 1100° C., 20% carbon is effective for generating conductive materials.

TABLE 2

Comparison of materials for electrical properties

| Material | Temperature of Furnace (° C.) | Electrical Property |
|---|---|---|
| Hurd | 600 | Weak |
| Hurd | 900 | Weak |
| Hurd | 1100 | Best |
| Hurd | 1200 | Same as 1100° C. |

Upon confirmation that the 1100° C. temperature optimized the char, we tested concentrations of the carbonized hemp within polypropylene to determine the limits of conductivity.

TABLE 3

Conductivity with polypropylene

| % Carbon by Weight | 1 micron carbon | 1.5 micron carbon |
|---|---|---|
| 1% | No conductivity | No conductivity |
| 2% | No conductivity | No conductivity |
| 4% | No conductivity | No conductivity |
| 5% | No conductivity | Conductive |
| 8% | Conductive | Conductive |
| 10% | Conductive | Conductive |
| 12% | Conductive | Conductive |
| 20% | Conductive | Conductive |
| 22% | Conductive | Conductive |

Interestingly, smaller particle sizes yielded materials that were less conductive than larger particle sizes. This was important where materials utilized between 5% and 8% carbon in the polymer yarn. So long as the material contained at least 8% of the carbonized hemp charred at above 1100° C., the material is conductive. This is surprising in that commercially available carbons, such as petroleum-based carbon black, are conductive beginning at about 20 wt. %.

Milling

Bio-char produced from the pyrolysis of cellulosic agricultural waste results in amorphous carbonized solids that exhibit similar electrical properties of CNTs. Herein, the methods, processes, and products utilize carbonized hemp as the cellulosic material to create carbonized materials having particle sizes of less than 2 microns to incorporate into materials, which can be utilized in master batches to generate spun fibers, spun or extruded fibers and films, composites, or through other postprocessing steps as known to those of ordinary skill in the art.

As used herein, the phrase "size of less than 2 microns" or another numerical size refers to the particles having a length, width, and height of less than the given integer. In most instances, the particle size will be an "average" particle size of less than x microns, with some percentage being absolute below the given size, for example, an average particle size of 2 microns or less, with 90% of the particles having a particle size of less than 2 microns. Thus, 10% of the particles may have one of the length, width, or height of greater than the 2 microns, but the average mean of all particles would be below the 2-micron size.

The size of the particle is important as the materials, specifically in the yarns, need to be both small in size and also consistent in size. Milling the hemp carbon yields particles of irregular shape and size, i.e. they are not organized or crystalline in shape, but which are consistent in their size of less than 2 microns in the major axis. However, milling thus yields materials that do differ in shape and size, and the entirety of a portion of hemp would be distributed in a normal bell curve shape under 2 microns.

Figure 1B:
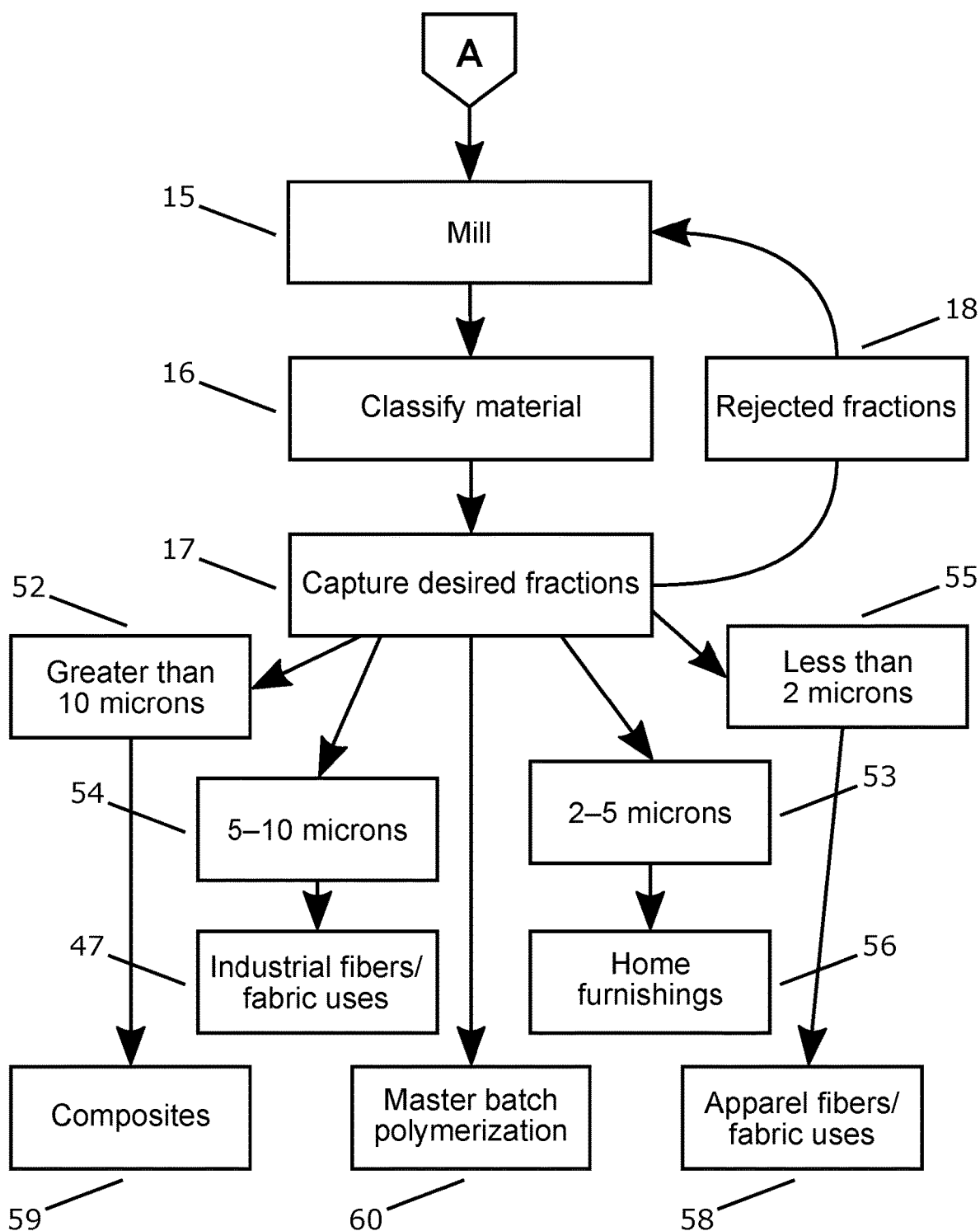

The process for making such less than 2-micron carbon is detailed in FIGS. 1A and 1B. After heating to a temperature of greater than 1100° C., the process continues in FIG. 1B to milling (15). As used herein, the term "specific classification size" refers to a percentage of particles within a certain given point as compared to the classification size. For example, a 90% specific classification size of 0.1-2 microns, means that at least 90% of all particles are between 0.1 and 2 microns. More preferably, a 95%, 99%, or greater than 99% specific classification size means that 95%, 99%, or more than 99% of particles are between 0.1 and 2 microns in size.

Furthermore, the specific classification size can be further narrowed by defining a specific micron size and bell curve. For example, a 99% specific classification size of 0.1-2 microns and a 95% 1.5-micron bell curve, a 95% bell curve means that 95% of all particles are within 2 standard deviations from 1.5 microns. The bell curve may be a 50%, 75%, 90%, 95%, 99%, or more than 99% bell curve. In essence, a tighter bell curve gives a particle size that is more homogeneous in size. Having something be more homogeneous leads to a better resulting product, especially for particles of less than 2 microns and certainly of less than 1 micron in size.

In a preferred embodiment, the particles have a 90% specific classification size of less than 2 microns, with a 90% bell curve at 0.5, 0.75, 1, 1.25, or 1.5 microns. This results in a 90% specific classification size of less than 2 microns, a 90% bell curve at 1.5 microns, and results in an average mean particle size of between 1 and 2 microns.

Figure 2:
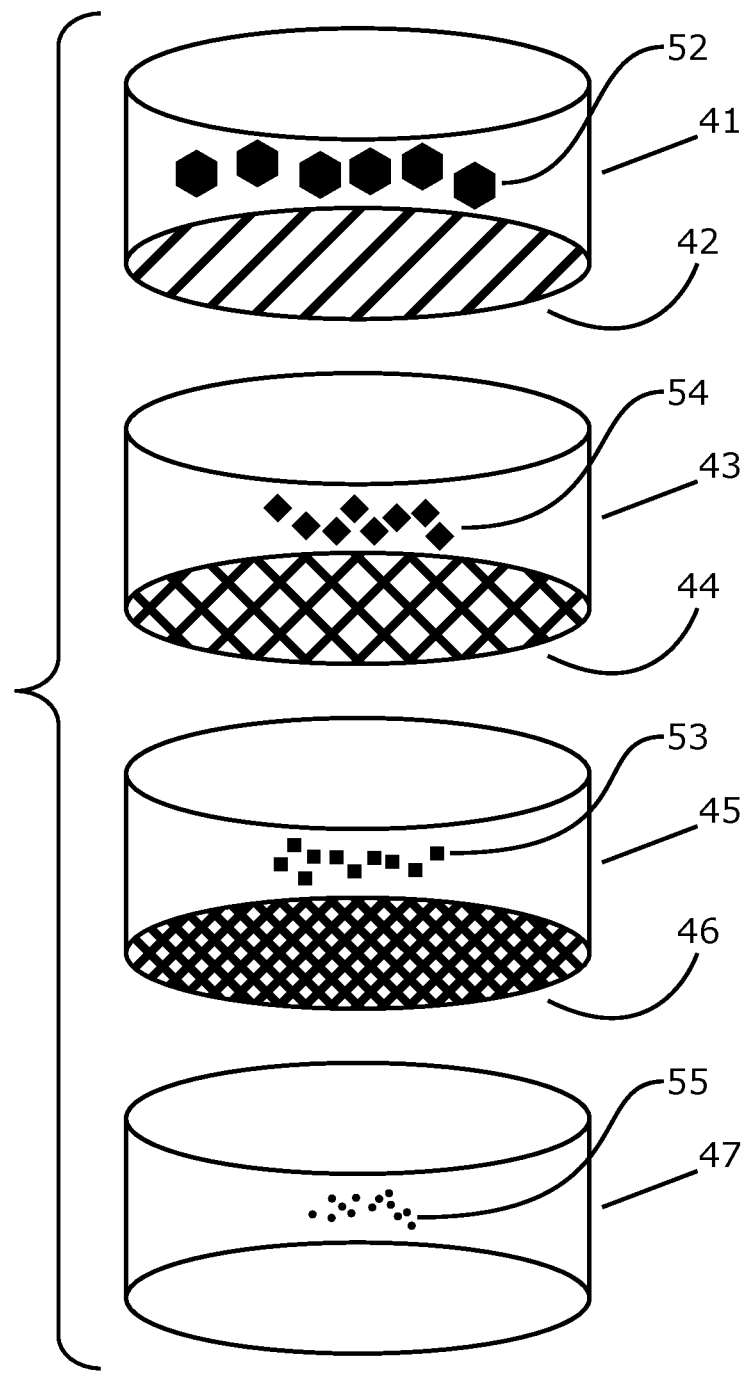
FIG. 2 depicts an exemplar classification system.

The classification process, e.g. in FIGS. 1A, 1B and 2, proved especially difficult at a suitable yield and to generate the specific classification size of less than 2 microns suitable for use in certain downstream processes. To form a material with 90% of particles smaller than 2 microns, with the average mean particle size between 1-2 microns, a screening or classification process is utilized to remove particles greater than 2 microns after the material is milled. For example, as detailed in FIG. 1B, the milling (15) step is followed by a classification step (16), and wherein desired fractions (17) are captured, and any rejected fractions (18) are remilled, to achieve smaller particle sizes.

To generate the suitable fractions and to form suitably sized particles, the process preferably utilizes a mechanical mill, such as an air jet mill, a ball mill, or another mill that mechanically contacts and breaks down the material into smaller parts. This yields materials that are less "flat" in shape and have a length, width, and height that have a smaller variance than typical flat carbons such as graphene, which are long and flat sheet-like materials. Accordingly, in FIG. 1B, the material is milled (15), and then classified (16). The classification process then separates the material into suitable fractions and the desired fractions are captured (17). Rejected fractions (18) are added back to the mill (15) to remill them to a smaller size. Preferred captured fractions include less than 2 microns (55), for use in apparel/fibers and fabric uses (58). Additional fractions between 2-5 microns (53) can be used for, e.g. home furnishings (56). Fractions between 5-10 microns (54) can be utilized for industrial fibers/fabric uses (47). For fractions greater than 10 microns (52), an exemplar use is with composites (59). These fractions are advantageously added to master batch polymerization (60) for such downstream uses as appropriate.

An example of a classification sieve set is defined by FIG. 2: a first classification container (41) with a first classification screen (42) captures a first material (52), a second classification container (43) and a second classification screen (44) captures a second material (54), a third classification container (45) and a third classification screen (46) captures a third material (53), and finally a fourth container (47) captures any material (55) that falls through the third classification screen (46).

As an example, the first classification screen (42) is 10 microns, the second classification screen (44) is 5 microns, and the third classification screen (46) is 2 microns. By adding the charred and milled hemp to the first container (41), any material (52) greater than 10 microns will be captured in the first container (41). This allows material (54) smaller than 10 microns and larger than 5 microns to be captured in the second container (43). Material (53) smaller than 5 microns and larger than 2 microns is captured in the third container (45), and finally all the material (55) smaller than 2 microns passes through the third classification screen (46) and into the fourth container (47). Those of skill in the art will recognize that there are other classification processes and machinery which can be utilized to separate and classify the materials into, specifically, the sub-2-micron level desired for use in fibers.

To commercially process the charred hemp to sub-2-micron particles, mechanical milling including air jet grinders, wet processors, high energy ball grinders, dry agitated media mills, and pressure grinding were utilized. The grinding process included times from about 1 hour to about 24 hours, with all times in between. Commercial attempts at grinding to 2 microns were suggested to be easily obtainable, yet actual processing to this size within acceptable tolerances (precision) and yields proved difficult. A primary issue in generating a small and substantially homogeneous particle size is that hemp carbon has a lighter bulk density than other cellulosic carbon materials, so in dry grinding the carbon floats around in the dry grinding mills, making it difficult to actually grind the material. Several different processes and methods were tested to optimize the milling and classification process in order to generate suitable yields of the less than 2-micron-sized material, including hand grinding, wet milling, and dry milling. To generate materials uniformly under the 2-micron size, classification is necessary. Classification may include screen classification, vibrating classification, spinning, or other forms of classification systems to separate larger particles from the desired fractions.

Micronized Carbon

The sub-2-micron carbon particles of the carbon used herein allow for consistent contact between adjacent particles in the resulting materials, thus improving the consistency of the material for purposes of mechanical properties including physical and electrical properties. Furthermore, the particle size in the 0.1-2-micron size is better able to be combined with polymers and other materials for creating fibers, films, and other materials for downstream processing regardless of whether it is extruded, spun, or manipulated in another form. Higher micron size (above 2 microns) provides usable materials but typically only for industrial purposes. Indeed, it is impossible to create the fine denier of sub-1-denier/filament to 5 deniers/filament for use in technical fabrics unless the sub-2-micron carbon is utilized for high speed yarn extrusion of mono- or multifilament yarn.

Yarn Formation

Animal-based yarns and plant-based yarns are spun together to create yarns of varying deniers and fiber lengths. By contrast, yarns of the present disclosure are both monofilament and multifilament configurations and are a continuously extruded material. The finest denier yarns are utilized in a number of materials but yield materials of superior finish as compared to industrial yarns. Fiber denier for athletic apparel and other material is typically between less than 1 denier (with silk being 1 denier), and ultralight materials having a denier of between about 1 and 5 deniers. Yarns can also be made from polymers, wherein the fibers to make the yarn are extruded at varying deniers to form the yarn. Herein, several examples of yarns are described which are made from a polymer, a polymer and full spectrum hemp extract, a polymer and hemp carbon, a polymer with full spectrum hemp extract and hemp carbon, and wherein each may include further excipients.

Manufacturing of Extruded Yarns

Manufacturing of yarns is made through extrusion. FIG. 5 details a simple flowchart of master batch and compound manufacturing, wherein a portion of thermoplastic (100) between 99.5 wt. % and 20 wt. % and an additive package (101) of between 0.5 wt. % and 80 wt. % are added to a twin screw extruder (102). The material is heated and mixed with the twin screw extruder to homogenize the material. The material is then quenched and pelletized (103) to yield a compound or master batch (104).

When admixing in quantities of pigment, oil, carbon, or other excipients, certain polymers need more force and support in mixing the materials, and thus it is not always suitable to simply mix excipients with bulk polymer. It may be necessary to use a twin screw extruding machine, having twin screws that corotate or counterrotate to assist in mixing of the materials. While twin screw machines are highly efficient as mixing materials, they are inferior to the single screw in extrusion. Accordingly, twin screw machines are useful in making master batches where a feedstock of polymer plus the hemp component and any other excipients may be added, mixed, and prepared into a concentrated material for subsequent use. An analogy to this material is concentrated soda syrup, which is mixed with carbonated water at the source to make fountain drinks. The similar concept occurs here, wherein a master batch is created and admixed with a bulk polymer, which is easily mixed together before it is extruded into the desired shape.

FIG. 6 then details the extrusion of monofilament yarn, wherein thermoplastic (110) of between 100-80 wt. % is added into a single screw extruder (112). A master batch (111) can be added at between 0 wt. % and 30 wt. %, as this amount can be homogenized with the thermoplastic (110) in the single screw extruder (112). The material goes through the spin beam (113), draws strands (114), and undergoes winding (115) of the extruded yarn filament.

FIG. 7 details a similar process wherein multifilament yarn extrusion begins again with a thermoplastic (110), combined with a master batch (111) into a single screw extruder (112), through a spin beam (113), then optionally to draw strands (114), and finally to a winder (115).

Monocomponent yarn extrusion comprises a process that includes selecting a polymer and extruding for single source materials. However, for a process that incorporates at least one other component, the polymer is admixed with at least one other excipient. Herein, the polymers are admixed FSHE for generating antimicrobial properties into the extruded yarn, when added at appropriate concentrations and when extruded under precise parameters. Additionally, other suitable materials, including a second or more oil or extract, a pigment, a UV stabilizer, an antioxidant or heat stabilizer, a flame retardant material, an antimicrobial agent, a nucleating or clarifying agent, an optical brightener, and a compatibilizer may be added to improve the properties of the yarn.

Figure 3A:
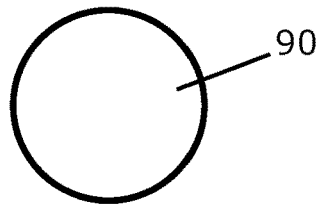
FIGS. 3A-3G depict samples of continuous fiber yarns, specifically having one, two, or three different constituent components.
Figure 3B:
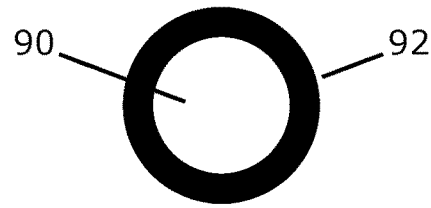
Figure 3C:
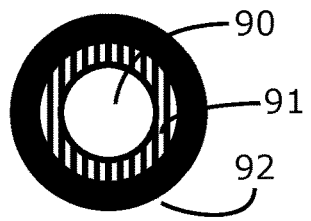
Figure 3D:
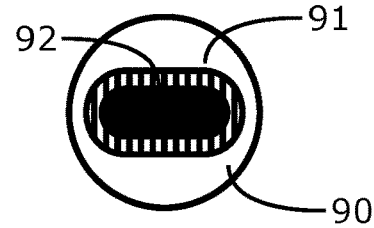
Figure 3E:
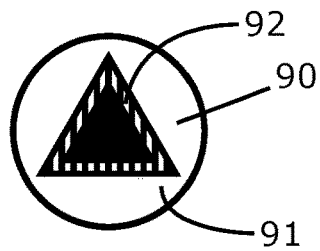
Figure 3F:
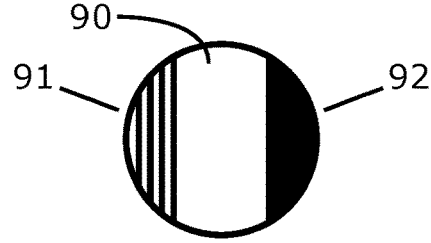
Figure 3G:
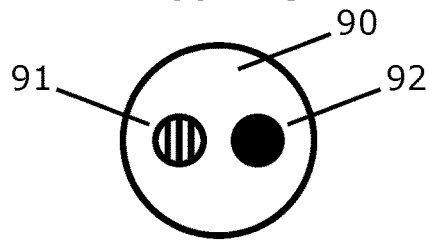

Yarn may come in a variety of shapes and sizes. FIGS. 3A-3G depict several examples of yarns. FIG. 3A depicts a monocomponent (one extruder) high viscosity homogeneous material (90). FIG. 3B depicts a bicomponent material with a sheath (92) and single core (90). FIG. 3C depicts a sheath (92) with a first core (91) and a second core (92) made with a tricomponent yarn with three extruders. FIG. 3D depicts a ribbon core (91) with an inner core (92) within the fiber (90). Interestingly, the material in the core in one example, may be a sheath in another example, depending on the desired product and purpose. The materials in FIGS. 3D-3G can each be a tricomponent material or a bicomponent material. Bicomponent materials simply use the same second component in the third extruder. Notably, FIGS. 3 and 4 each use the same materials, simply oriented in different locations.

Figure 4A:
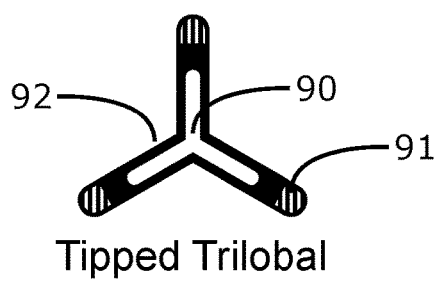
FIGS. 4A-4E depict further examples of continuous fiber yarns.
Figure 4B:
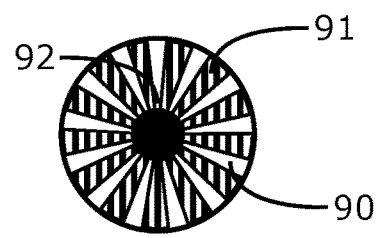
Figure 4C:
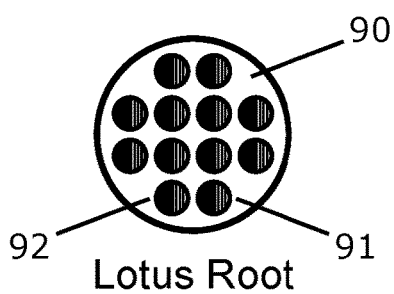
Figure 4D:
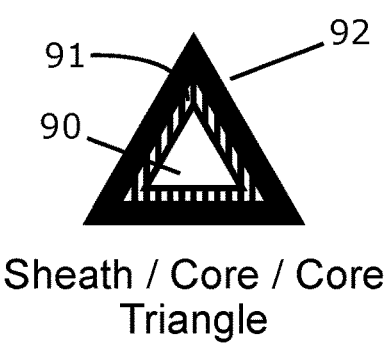
Figure 4E:
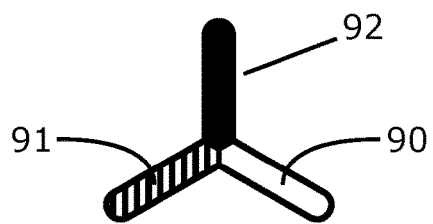

Additional yarn samples are provided by FIGS. 4A-4E. Namely, FIG. 4A details a tipped trilobal yarn with a core (90), a sheath (92), and a third tipped material (91) at each end of the yarn. FIG. 4B details a winged fiber, comprising a core (92) with opposing polymers (91 and 90) oriented around the core. FIG. 4C details a lotus root yarn, with a sheath (90) and multiple cores, each comprising a first core (91) and second core (92). FIG. 4D details a triangular yarn with a sheath (92), and inner cores (91 and 90). Finally, FIG. 4E details self-bulking trilobal yarns with three lobes (90, 91, and 92), each a different polymer.

Single component fibers are those comprising only a single mixture of material, which is extruded to form the continuous fiber material. Bicomponent fibers utilize two different materials and tricomponent fibers thus contain three different components. These may be the same polymer with varying excipients, a similar polymer of different molecular weight, or a wholly different polymer.

In certain embodiments, instead of making fibers, the material is formed by extrusion, blow molding, casting, or other molding processes, which can utilize a thermoplastic or thermoset polymer. In such embodiments, a primary goal is to create a sustainable and environmentally responsible composite filler material suitable for use in a variety of master batch processes, and as a replacement for the more expensive and time/process intensive CNTs (carbon nanotubes) and graphenes in any number of composite materials, applicant has identified micron- and submicron-sized particle hemp-based materials optimal for a feedstock for nanocomposite production. Indeed, these carbon materials derived from hemp are significantly cleaner than prior art materials, i.e. those derived from petroleum-based industries. The hemp-based carbon has substantially lower levels of polycyclic aromatic hydrocarbons (PAHs), and requires significantly less fossil fuels to manufacture as compared to the petroleum-based materials. Indeed, the hemp based carbon made by the claimed processes contains at least 10% less PAH than carbon black, a petroleum based carbon; and of the PAH identified in the hemp carbon, 33% of them are below the reporting limits. Accordingly, the hemp based carbon is significantly cleaner that carbon black with regard to the PAH quantities.

Examples of Oil and Carbon-Based Composites

Various samples were created using polypropylene polymer and FSHE. The samples utilized a full spectrum hemp extract at 0.16%, 0.24%, 0.40%, and 0.6% by weight in the resultant yarns. These yarn trials were produced from two master batches that were loaded with 8% and 12% FSHE oil then combined in various multifilament yarns with letdown ratio (LDR) (the master batches were added at various rations from 2% to 5% of the total weight) and the extruded yarns tested for various properties. Denier was tested for each of the fibers, with the range between 421 and 426 grams/9000 meters. Then, each sample was tested for load at variable elongations (gf) at 5%, 25%, and 50%, as detailed in the table. Finally, critical tensile properties of elongation (%), maximum load (gf), and tenacity (gf/den) were tested. The material tested was industrial weight. Lower denier fibers were tested and performed with similar outcomes. This test was repeated with additional polymers to confirm the results and process, as well as tested for antibacterial properties. Furthermore, this test was performed with smaller denier materials including fine multifilament yarns at 40-70 deniers. The loads for a 421 denier yarn are proportional to a 42.1 denier yarn and are roughly 1/10 of the stated values.

Elongation refers to the amount the yarn can stretch before it breaks. The yarn is tested in a tensile testing device with a load cell on a motor which pulls the yarn lengthwise to apply a load. The total length and the load are determined before it breaks. This data is then used to normalize with the denier size of the yarn, which is measured as tenacity.

TABLE 4 workability of the materials

| Master Batch Material | 0.5% | 1% | 2% | 5% | 10% | 15% | 17.5% | 20% | 22% | 25% |
|---|---|---|---|---|---|---|---|---|---|---|
| PLA | G | G | G | G | G | G | OK | D | P | P |
| Nylon 6 | G | G | G | G | G | G | G | OK | D | P |
| PET | G | G | G | G | G | G | G | OK | D | P |
| Polypropylene | G | G | G | G | G | G | G | OK | D | P |

G = Good  OK = Slightly worse than good
D = Difficult, inconsistent product  P = Poor, unworkable Thus, as depicted in Table 4, a percentage of 15% or less in a 10% LDR (i.e. 1.5 wt. % of the final product), appears to be superior for products for manageability and workability among all materials, though 17.5% appears to be good for materials other than PLA.

TABLE 5

Polypropylene tests
Multifilament FSHE Polypropylene Trials

| Product Identification and Formulation | | Load at Variable | | | Critical Tensile Properties | | | Melt | |
|---|---|---|---|---|---|---|---|---|---|
| Sample | Additive | Denier | Elongations (gf) | | | Elongation | Maximum | Tenacity | Temp. | |
| Type | LDR | (g/9000 m) | 5% | 25% | 50% | (%) | Load (gf) | (gf/den) | (° C.) | Comments |
| PP | N/A | 421 | 65 | 312 | 400 | 202 | 999 | 2.37 | 247 | Stable process |
| PP + FSHE | 2.0% | 424 | 62 | 288 | 346 | 245 | 860 | 2.03 | 247 | Stable process |
| PP + FSHE | 5.0% | 425 | 63 | 317 | 357 | 254 | 772 | 1.82 | 247 | Stable process |
| PP + FSHE | 10.0% | 425 | 37 | 294 | 326 | 276 | 692 | 1.63 | 247 | Stable process |
| PP + FSHE | 15.0% | 424 | 63 | 315 | 345 | 294 | 685 | 1.62 | 247 | Stable process |
| PP + FSHE | 20.0% | 426 | 59 | 307 | 337 | 285 | 705 | 1.66 | 247 | Stable process |
| PP + FSHE | 25.0% | 425 | 63 | 323 | 354 | 288 | 649 | 1.53 | 247 | Unstable process |

Table 5 depicts that polypropylene serves as a suitable polymer for low amounts of full spectrum hemp oil extract. However, in the last sample at 25% LDR, the material became unstable, and spinning of the material was difficult and the process unstable, thus reaching the saturation point for the material. However, even the material shows somewhat significant modifications of maximum load and tenacity at 5-20% LDR concentrations, while increasing the elongation of the material.

TABLE 6

Nylon tests
Multifilament FSHE Nylon Trials

| Product Identification and Formulation | | Load at Variable | | | Critical Tensile Properties | | | Melt | |
|---|---|---|---|---|---|---|---|---|---|
| Sample | Additive | Denier | Elongations (gf) | | | Elongation | Maximum | Tenacity | Temp. | |
| Type | LDR | (g/9000 m) | 5% | 25% | 50% | (%) | Load (gf) | (gf/den) | (° C.) | Comments |
| Nylon 6 | N/A | 304 | 148 | 244 | 449 | 89.00% | 837 | 2.76 | 281 | Stable process |
| Nylon 6 + FSHE | 1.0% | 300 | 177 | 303 | 564 | 79.20% | 882 | 2.94 | 282 | Stable process |
| Nylon 6 + FSHE | 3.0% | 298 | 225 | 348 | 596 | 79.00% | 911 | 3.05 | 282 | Stable process |

TABLE 6-continued

Nylon tests
Multifilament FSHE Nylon Trials

| Product Identification and Formulation | | | Load at Variable Elongations (gf) | | | Critical Tensile Properties | | | Melt Temp. | |
|---|---|---|---|---|---|---|---|---|---|---|
| Sample Type | Additive LDR | Denier (g/9000 m) | 5% | 25% | 50% | Elongation (%) | Maximum Load (gf) | Tenacity (gf/den) | (° C.) | Comments |
| Nylon 6 + FSHE | 6.0% | 296 | 210 | 328 | 569 | 82.40% | 915 | 3.09 | 283 | Stable process |
| Nylon 6 + FSHE | 10.0% | 300 | 231 | 353 | 596 | 80.40% | 922 | 3.07 | 285 | Stable process |
| Nylon 6 + FSHE | 14.0% | 297 | 248 | 397 | 677 | 75.00% | 957 | 3.22 | 285 | Stable process |
| Nylon 6 + FSHE | 20.0% | 298 | 252 | 411 | 696 | 71.20% | 929 | 3.12 | 285 | Stable process |
| Nylon 6 + FSHE | 30.0% | 298 | 273 | 441 | 740 | 68.30% | 940 | 3.16 | 286 | Unstable process |

Like the polypropylene, Nylon 6 was tested with a wide range of concentrations of the full spectrum hemp oil extract, and at 30% the process became difficult and unstable, though some samples were able to be generated. This confirms that processing of full spectrum hemp oil extract with a polymer at greater than 20.0% LDR for a 10 wt. % master batch stresses the process beyond its limits. Thus, a 2.0 wt. % of full spectrum hemp extract oil is the outer limit for concentration within a Nylon 6 polymer.

PLA was tested with the FSHE at 8% master batch for the first three samples and then 12% for the fourth sample. All samples were stable and functioned.

Key Characteristics of Selected Oils
Addition of Essential Oils to the Carbon and Polymer Materials The extraction of oil from seeds and other plant green material is not unique to hemp. For example, there are numerous known oils that are widely utilized for their

TABLE 7

PET tests
Multifilament FSHE PET Trials

| Product Identification and Formulation | | | | Load at Variable Elongations (gf) | | | Critical Tensile Properties | | | |
|---|---|---|---|---|---|---|---|---|---|---|
| Sample Type | Additive LDR | Melt Temp. (° C.) | Denier (g/9000 m) | 10% | 25% | 50% | Elongation (%) | Maximum Load (gf) | Tenacity (gf/den) | Comments |
| PET | N/A | 280 | 404 | 185 | 209 | 348 | 109% | 884 | 2.09 | Stable process |
| PET + FSHE | 10.0% | 284 | 401 | 183 | 216 | 334 | 105% | 767 | 1.91 | Stable process |
| PET + FSHE | 15.0% | 278 | 399 | 152 | 190 | 336 | 102% | 725 | 1.82 | Stable process |
| PET + FSHE | 20.0% | 280 | 401 | 205 | 225 | 375 | 105% | 768 | 1.92 | Stable process |

PET was tested at fewer concentrations to confirm efficacy of the material at similar concentrations to the PLA and Nylon 6. The results confirm that the material was similar to the control, with only slight losses in the maximum load.

aromatic properties and other residential, commercial, and industrial purposes. Other oils include: allspice, angelica, anise, basil, bay leaf, benzoin, bergamot, birch, bitter almond, black pepper, boldo, buchu, cajuput, calamus,

TABLE 8

PLA tests
Multifilament FSHE PLA Trials

| Product Identification and Formulation | | | Load at Variable Elongations (gf) | | | Critical Tensile Properties | | | |
|---|---|---|---|---|---|---|---|---|---|
| Sample Type | Additive LDR | Denier (g/9000 m) | 10% | 25% | 50% | Elongation (%) | Maximum Load (gf) | Tenacity (g/f/den) | Comments |
| PLA | N/A | 406 | 267 | 434 | 834 | 64% | 970 | 2.39 | Stable process |
| PLA + FSHE | 2.0% | 402 | 278 | 445 | 842 | 64% | 993 | 2.47 | Stable process |
| PLA + FSHE | 3.0% | 404 | 292 | 461 | 867 | 64% | 1017 | 2.52 | Stable process |
| PLA + FSHE | 5.0% | 402 | 285 | 449 | 840 | 64% | 980 | 2.44 | Stable process |
| PLA + FSHE (12%) | 5.0% | 402 | 285 | 444 | 840 | 63% | 974 | 2.43 | Stable process | chamomile, camphor, caraway, cardamom, carrot seed, cassia, catnip, cedarwood, cinnamon, citronella, clary sage, clove, coriander, cumin, cypress, davana, dill, elemi, eucalyptus, fennel, frankincense, galbanum, geranium, ginger, grapefruit, helichrysum, hyssop, jasmine, juniper, lavandin, lavender, lemon, lemongrass, lime, mandarin, manuka, marjoram, melissa, mugwort, mullein, mustard, myrrh, myrtle, neroli, niaouli, nutmeg, oakmoss, orange, oregano, palma rosa, parsley, patchouli, pennyroyal, peppermint, petitgrain, pimento, pine, ravensara, rose, rosemary, rosewood, rue, sage, sandalwood, spearmint, spikenard, tagetes, tangerine, tansy, tarragon, tea tree, thuja, thyme, tuberose, vanilla, vetiver, wintergreen, wormwood, yarrow, and ylang ylang.

Applicant tested several of these oils, in various concentrations and with different carriers in order to determine efficacy of the material, specifically as imparted into a fiber, or film, and then as a textile material. For example, peppermint oil, eucalyptus oil, tea tree oil, citrus oils, oils from aromatic plants such as lavender and chrysanthemum, and hemp oils were tested under such different conditions in order to determine whether combining oils into a fiber was possible, and the concentrations of the oils suitable for fiber and film formation, as well as the concentration necessary to impart properties from the oils to the fibers.

HEMP OILS: Hemp seed oil comes from the seeds of the hemp plant. Cold pressed hemp oil preserves hemp's nutritious content, so it is often called "Nature's most perfectly balanced oil." Unrefined, cold pressed hemp oil is processed in minimal heat. This means that the oil has not been bleached or deodorized.

Full spectrum hemp extract is different than the hemp oil and specifically refers to when the components of the hemp plant are extracted from hemp and contain all the cannabinoids, terpenes, and compounds found in the original hemp plant and which are capable of extraction in the particular extraction method.

A full spectrum hemp oil comprises hemp oil and a portion of full spectrum hemp extract. Unlike isolated or synthetic cannabinoids, full spectrum hemp oil contains an array of cannabinoids, as well as many essential vitamins and minerals, fatty acids, protein, chlorophyll, fiber, flavonoids, and terpenes. These cannabinoids work together in what is called the entourage effect. The entourage effect improves the absorption of active ingredients. Because cannabinoids are chemically polar compounds, sometimes it can be difficult for them to be absorbed. The other natural constituents may help improve their absorbability and viability.

PEPPERMINT OIL: Peppermint oil is used as an analgesic, anesthetic, antiseptic, antigalactagogue, antiphlogistic, antispasmodic, astringent, carminative, cephalic, cholagogue, cordial, decongestant, emmenagogue, expectorant, febrifuge, hepatic, nervine, stimulant, stomachic, sudorific, vasoconstrictor, and as a vermifuge. Peppermint oil is commonly used in the treatment of pain relief, as a way to induce numbness, protect against sepsis, reduce milk flow and discharge, relax spasms, strengthen gums, stop hair loss, and lift skin. Also, it induces firmness in muscles, stops hemorrhaging, removes gas, is good for brain and memory health, promotes bile discharge, clears congestion and eases breathing. Furthermore, peppermint essential oil relieves obstructed menstruation, expels phlegm and catarrh, reduces fever, and is good for liver and stomach, while promoting perspiration and a slight contraction of the blood vessels.

LAVENDER ESSENTIAL OIL: Lavender essential oil can be calming, sleep inducing, analgesic, disinfectant, anti-inflammatory, antiseptic, and antifungal. Lavender oil is beneficial for the treatment of issues with the nervous system, insomnia, pain relief, urine flow, respiratory disorders, skin care, hair care, blood circulation, indigestion, and immune system health.

EUCALYPTUS OIL: Eucalyptus oil has a number of important qualities, including anti-inflammatory, antispasmodic, decongestant, deodorant, antiseptic, antibacterial, and stimulating. Eucalyptus oil is especially useful in the treatment of respiratory problems, wounds, muscle pain, mental exhaustion, dental care, skin care, diabetes, fever, and intestinal germs.

TEA TREE ESSENTIAL OIL: Tea tree essential oil is antibacterial, antimicrobial, antiviral, fungicide, insecticide, antiseptic, balsamic, cicatrisant, expectorant, stimulant, and sudorific in nature. Tee tree oil is often used to inhibit bacterial, microbial, and viral infections, while also killing insects, protecting wounds from becoming septic, promoting absorption of nutrients, and speeding up the healing rate of scars and after marks. Finally, it can cure cough and cold and stimulate systemic functions and appropriate discharges.

CITRUS OILS (LEMON): Lemon essential oil is an antiseptic, antiviral, astringent, aperitif, bactericidal, disinfectant, febrifuge, hemostatic, restorative, and tonic. Lemon (or other citrus) oil protects from wounds becoming septic, while inhibiting viral and bacterial growth, strengthening gums, and stopping hair loss. Furthermore, it lifts skin, induces firmness in muscles, stops hemorrhaging, fights infections, and reduces fever.

CHRYSANTHEMUM ESSENTIAL OIL: Chrysanthemum essential oil extracted from the chrysanthemum plant has long been used as an all-natural organic pesticide and insect repellent and contains the chemical pyrethrum. Chrysanthemum oil and extract have also been used in herbal medicine for their antibacterial and antibiotic properties. The oil of the chrysanthemum flower also has a pleasant scent.

CITRONELLA OIL: citronella is extracted from *Cymbopogon nardus* and typically contains citronellal, geraniol, geranial, citronellol, and neral in varying quantities from about 28% to about 11%. The oil is used as an all-natural organic pesticide and insect repellent.

Key Characteristics of Insect Repellant Fabrics

Additional oils may be advantageously added to the extruded materials, and in appropriate concentrations these materials may impart further properties to the product, including arthropod repellent properties.

Therefore, the materials of the present embodiments define a material that possesses strong arthropod (bug) repellent properties when including a percentage of essential oils. The term "repel" or "repellent" means that the arthropods are deterred from the material, as compared to a control material. In a preferred embodiment, a material comprises about 0.5% to about 2.0% of one or more oils, and at least one polymer. In creating materials for repelling arthropods, the FSHE was combined with tea tree, lavender, citronella, or chrysanthemum oils and tested for their ability to repel arthropods.

TABLE 9

| Nylon 6 with % FSHE/ % Chrysanthemum Oil | Ants (Contacts in 5 min) | Mosquitos (Contacts in 5 min) | Ticks (Contacts in 5 min) |
| --- | --- | --- | --- |
| 0/0 | 31 | 16 | 11 |
| 0.2/0 | 30 | 16 | 12 |
| 0.5/0 | 30 | 15 | 11 |
| 0.75/0 | 38 | 18 | 13 |
| 1.0/0 | 28 | 21 | 12 |
| 1.25/0 | 28 | 18 | 9 |
| 0/0.2 | 32 | 17 | 10 |
| 0/0.5 | 34 | 15 | 9 |
| 0/0.75 | 26 | 17 | 8 |
| 0/1.0 | 22 | 15 | 9 |
| 0/1.25 | 26 | 18 | 8 |
| 0.2/0.2 | 32 | 17 | 10 |
| 0.5/0.5 | 7 | 6 | 4 |
| 0.75/0.75 | 5 | 6 | 3 |

TABLE 9-continued

| Nylon 6 with % FSHE/ % Chrysanthemum Oil | Ants (Contacts in 5 min) | Mosquitos (Contacts in 5 min) | Ticks (Contacts in 5 min) |
|---|---|---|---|
| 1/1 | 6 | 7 | 3 |
| 1.25/1.25 | 6 | 4 | 2 |

In testing the ability of a material to reduce contacts with a material surface and thus repel an insect, three commonly known insects were tested. Samples were placed in a box with a predetermined number of insects, a control was tested, then materials having only the FSHE, only the chrysanthemum oil, and finally with both the FSHE and chrysanthemum oil. The data is clear that a combination of the FSHE and the chrysanthemum yields materials that reduce the contact rate of the insects by typically 50%.

After success with the chrysanthemum oil, materials were made at 0.5/0.5 and 1.0/1.0 for both tea tree oil, lavender oil, and citronella oil to confirm the ability of multiple oil extracts to provide arthropod repellency. The materials provided similar results at both concentrations, to confirm the ability of a variety of materials to provide this function.

Reduction of Bacterial Loads with FSHE-Infused Materials

Antimicrobial fabrics are designed and developed to inhibit or destroy the growth of microorganisms, which include things like bacteria and fungi. Microorganisms can live in a fabric and grow at uncontrolled rates and therefore, antimicrobial fabrics help reduce the spread of disease. That is why antimicrobials are so effective: they prevent the growth and spread of microorganisms within the fabric. This is especially useful in the healthcare industry where exposure to bacteria and other pathogens is possible on a daily or hourly basis. This is also useful where mold can grow easily, such as outdoor fabrics, as well as in technical and athletic apparel. One can imagine a nearly unlimited set of uses for materials that are capable of resisting growth of bacteria and fungi.

Common bacteria utilized for testing such antibacterial properties include *E. coli*, MSSA and MRSA. MSSA is often a first line bacteria for testing efficacy of materials, while MRSA is a different bacterium that is often referred to as one of the most difficult to address once populations are embedded. The extruded materials of the present disclosure were tested for antimicrobial properties against these bacteria at difference concentrations of full spectrum hemp extract within the extruded materials.

A number of studies were performed with various samples toward *Staphylococcus aureus*, *Escherichia coli*, and Methicillin-resistant *S. Aureus* (MRSA) with several different polymers and at different concentrations. The summary in the table below shows that bacterial loads are impacted and killed beginning at about 0.4 wt. %, with higher kill rates beginning at 0.6 wt. % and improving more at 0.75 wt. %. In Nylon, the weight percentage needed to be at about 1.0, which was slightly higher than other materials. However, other materials provided significant kill rates at about 0.75 wt. % and improving at 0.8 wt. %.

TABLE 10

| | reduction in MSSA loads | | | | | |
|---|---|---|---|---|---|---|
| Master Batch (% FSHE Oil in Master Batch) | 0.5% | 2% | 5% | 10% | 15% | 20% |
| PLA 5% LDR | 0 | 0 | 0 | 80 | 98 | 99 |
| Nylon 6 5% LDR | 0 | 0 | 0 | 72 | 95 | 99 |
| PET 5% LDR | 0 | 0 | 0 | 80 | 98 | 99 |
| PP 5% LDR | 0 | 0 | 0 | 80 | 98 | 99 |
| PLA 8% LDR | 0 | 0 | 20 | 98 | 99 | 99 |
| Nylon 6 8% LDR | 0 | 0 | 20 | 98 | 99 | 99 |
| PET 8% LDR | 0 | 0 | 20 | 98 | 99 | 99 |
| PP 8% LDR | 0 | 0 | 20 | 98 | 99 | 99 |
| PLA 10% LDR | 0 | 0 | 80 | 99 | 99 | 99 |
| Nylon 6 10% LDR | 0 | 0 | 72 | 99 | 99 | 99 |
| PET 10% LDR | 0 | 0 | 80 | 99 | 99 | 99 |
| PP 10% LDR | 0 | 0 | 80 | 99 | 99 | 99 |
| PLA 12% LDR | 0 | 0 | 97 | 99 | 99 | 99 |
| Nylon 6 12% LDR | 0 | 0 | 90 | 99 | 99 | 99 |
| PET 12% LDR | 0 | 0 | 97 | 99 | 99 | 99 |
| PP 12% LDR | 0 | 0 | 97 | 99 | 99 | 99 |

The weight percentage can be calculated by taking the percent of the full spectrum hemp oil within a master batch, and then determining the amount in the final product, where letdown ratio (LDR) refers to the percentage of the master batch. For example, a 10% LDR means 90% polymer and 10% master batch in the final product. The master batches themselves can have different concentrations, with the top row showing concentrations of the full spectrum hemp extract at 0.5%, 1%, 2%, 5%, 10%, 15%, and 20% of the master batch. This means that a 20% master batch with 5% LDR yields a final weight percentage of 1.0 of the full spectrum hemp extract in the product. Similarly, a 10% master batch with a 10% LDR also yields a 1.0 wt. % in the final product.

Efficacy Of Fibers Toward *E. Coli*, Staph, and MRSA

The full spectrum hemp extract is an additive that is added in the master batch process. As with many products, the goal of the material is to achieve a desired kill rate of bacteria at the lowest concentrations to ensure that the fiber is not impacted and also to reduce costs of the material. While concentrations above 1.0 wt. % are effective, they are unnecessary for the current bacterial tested. Furthermore, at some of the higher concentrations, as depicted in other examples, the fiber is stressed and degraded. Accordingly, in the broadest range, a weight percentage from 0.6 wt. % to 1.2 wt. % provides both efficacy and also cost. Even more preferred, to ensure that there is adequate kill, a weight percentage above 0.8 wt. % to 1.2 wt. % is superior. Indeed, the above data confirms this range having efficacy, and other data, which is not shown, also tested 0.9 wt. % for Nylon, and confirmed that Nylon was effective with the full spectrum hemp extract at 0.9 wt. %.

Fiber formation and ease of use was tested among varying master batches with a 10% LDR, with concentrations of the master batch at 0.5% to 25%. Notably, the material was easy to work with, with negligible changes in the master batch up until 17.5% full spectrum hemp extract concentration of the master batch. By 20%, the material was very difficult to work with, and PLA and the other polymers begun to suffer from workability. At 22% and 25% the material becomes all but unworkable and fails to yield the necessary continuous filament yarn that is desired for production.

Manufactured and Knitted Products

Yarns can be advantageously manufactured to comprise FSHE in the concentrations indicated herein, which provide for antibacterial properties. These materials can be utilized in medical products, as well as athletic and performance wear and also in materials that are prone to bacterial or viral attack.

Figure 8A:
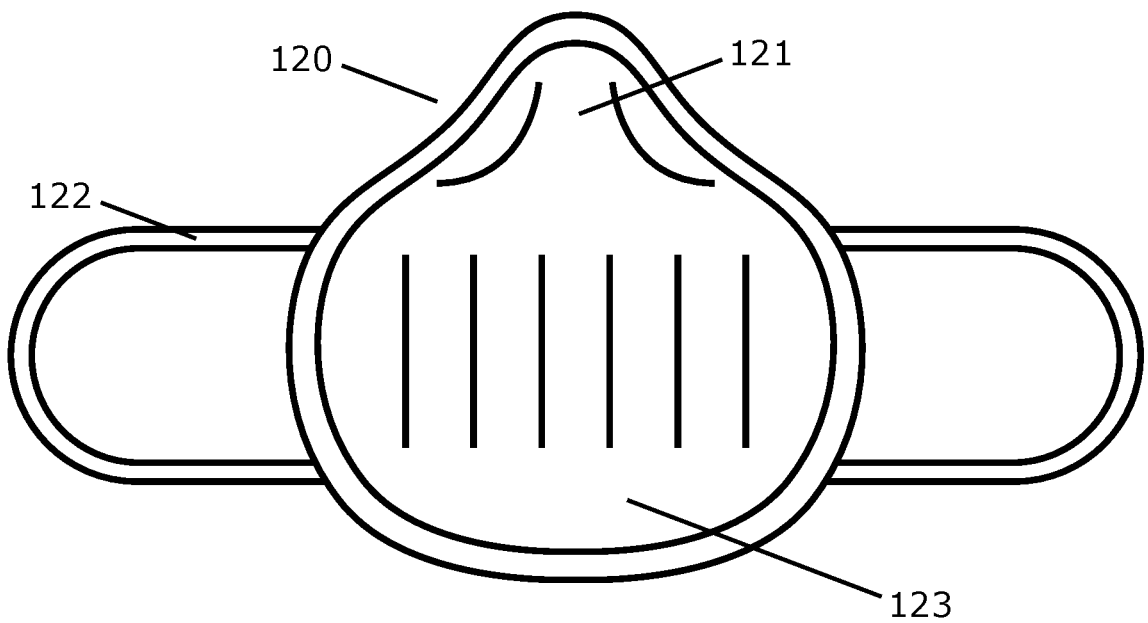
FIGS. 8A and 8B depict a facial mask.
Figure 8B:
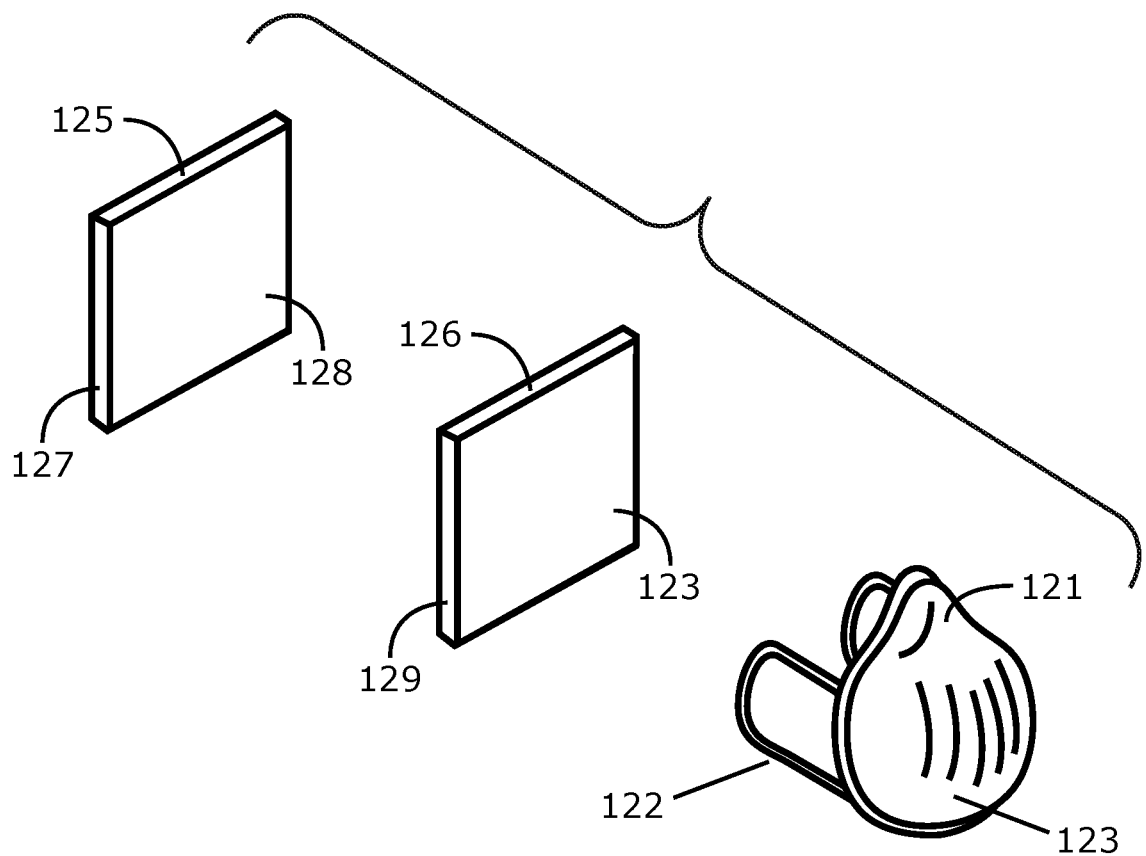

A particular material right now under bacterial and viral attack is facial masks that may be required for prevention of and reduction in the transmission of viral loads. FIGS. 8A and 8B detail a facial mask comprising the polymer yarns of the present disclosure. The facial mask (120) was provided in a three-dimensional knitted material, i.e. it possesses a shape, comprising a Nylon 6 base polymer and 1% by weight of FSHE in the multifilament yarn, which is 4 plies of 150 denier/136 filament count textured nylon. The yarn was then knitted into a facial mask having a three-dimensional characteristic in a cup shape, to fit the face of a person.

The mask is made of an inner layer (125) and an exterior layer (126). The mask exterior layer (126) is made of 4 ply 150 denier multifilament textured yarn of Polyester infused with 2.0 to 5.0% of copper particles. Specific embodiments utilized approximately 2.6% copper particles. The outer layer comprises 4 ply materials, sandwiched together to form a single outer layer (126), and defines and outer face (123) and an inner face (129). The mask interior layer (125) is made of 4 ply 150 denier multifilament textured yarn of Nylon infused with ~1.0% FSHE particles as disclosed in the present disclosure. The inner layer comprises an inner layer inner face (127) and inner layer outer face (128). The inner layer again is knitted to form a 4 ply material. The inner layer (125) and the exterior layer (126) are then knitted together wherein the faces (128 and 129) are adjacent. A nose bridge (121) is formed with or without a metal support within the exterior layer (126), so as to be secure around the nose.

The ear straps (122) are secured via securing means to the mask layers to allow the mask to be secured to the face of a user. The straps being made of a Nylon and Spandex double covered yarns with 140 denier Spandex and 70 denier textured Nylon in each cover.

In further embodiments, several modifications are suitable, depending on the intended use of the material, including whether the masks are single use or washable. For modifications: 1) finer or courser deniers of yarns may be utilized in the interior or exterior layers to provide softer materials or better wear; 2) the exterior could be FSHE, silver, copper, and/or zinc infused in Polyester or Nylon; 3) three or four layers of fabric may be utilized, to allow for different materials within the mask; 4) the mask may include a pocket for incorporating an additional replaceable alternate filter media or antimicrobial or antiviral media for added/supplemental protection.

What is claimed is:

1. A method of forming a composite fiber comprising:
   combining a thermoplastic polymer with a portion of a hemp derivative, wherein said hemp derivative comprises: a carbonized hemp which is charred at between 1100° C. and 1500° C. and milled into a powder of less than 2 microns in size and a full spectrum hemp extract;
   mixing the thermoplastic polymer with the portion of hemp derivative and heating the same to a melt temperature; and
   extruding the composite fiber.

2. The method of claim 1 wherein said fiber is a single component, a bicomponent, or a tricomponent yarn.

3. The method of claim 1 wherein the composite fiber is a thread having a denier size of between 0.1 and 40.

4. The method of claim 1 wherein the composite fiber further comprises between 0.1 and 20.0 weight percent of carbonized hemp.

5. The method of claim 1, wherein the full spectrum hemp extract is between 0.1 and 2.0 weight percent of the composite.

6. The method of claim 1 wherein the thermoplastic polymer and portion of hemp derivative are further mixed with at least one excipient selected from the group consisting of: pigments, UV stabilizers, antioxidants, heat stabilizing components, flame retardants, antimicrobial agents, nucleating or clarifying agents, optical brighteners, compatibilizers, and combinations thereof.

7. The method of claim 1 wherein the carbonized hemp comprises 95% of particles between 0.1 and 2 microns.

8. The method of claim 1 wherein the portion of hemp derivative is admixed via a master batch, said master batch comprising between 1% and 50% of the total weight of the composite fiber.

* * * * *